US012719610B2

(12) United States Patent
Xu et al.

(10) Patent No.: US 12,719,610 B2
(45) Date of Patent: Aug. 25, 2026

(54) DATA PROCESSING METHOD AND APPARATUS

(71) Applicant: HUAWEI TECHNOLOGIES CO., LTD., Shenzhen (CN)

(72) Inventors: Rui Xu, Shanghai (CN); Shuri Liao, Shanghai (CN); Erkai Chen, Kista (SE); Youlong Cao, Shanghai (CN); Shengyue Dou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 18/500,153

(22) Filed: Nov. 2, 2023

(65) Prior Publication Data

US 2024/0106569 A1 Mar. 28, 2024

Related U.S. Application Data

(63) Continuation of application No. PCT/CN2022/076221, filed on Feb. 14, 2022.

(30) Foreign Application Priority Data

May 28, 2021 (CN) ......................... 202110588809.0

(51) Int. Cl.
*H04L 1/00* (2006.01)

(52) U.S. Cl.
CPC ............ *H04L 1/0061* (2013.01); *H04L 1/004* (2013.01); *H04L 1/0041* (2013.01); *H04L 1/0057* (2013.01)

(58) Field of Classification Search
None
See application file for complete search history.

(56) References Cited

U.S. PATENT DOCUMENTS

| | | | | |
|---|---|---|---|---|
| 9,160,485 | B2 * | 10/2015 | Kim | H04L 27/34 |
| 2019/0312675 | A1 * | 10/2019 | Yokomakura | H04L 1/0041 |
| 2020/0220657 | A1 | 7/2020 | Zheng et al. | |
| 2020/0396739 | A1 | 12/2020 | Sundararajan et al. | |
| 2021/0136695 | A1 * | 5/2021 | Liu | H04L 5/0055 |

FOREIGN PATENT DOCUMENTS

EP 3641443 A1 4/2020

OTHER PUBLICATIONS

3GPP TSG RAN WG1 #90bis, R1-1718353, "TB size determination and channel coding considerations," Document for: Discussion and Decision, MediaTek Inc., Prague, Czechia, Oct. 9-13, 2017; 8 total pages.

* cited by examiner

*Primary Examiner* — Jutai Kao
(74) *Attorney, Agent, or Firm* — Rimon PC

(57) ABSTRACT

This application provides a data transmission method and an apparatus that are used for extended reality (XR) technologies. In a data transmission method disclosed herein, different parts of to-be-transmitted data are segmented into different code blocks (CBs), to mitigate impact of a transmission failure of one part of the to-be-transmitted data on another part of the to-be-transmitted data, thereby improving overall user experience in data reception. In this way, transmissions of low priority data and high priority data may be separated to avoid performance degradation caused by the low priority data on the high-priority data.

13 Claims, 6 Drawing Sheets

DATA PROCESSING METHOD AND APPARATUS

CROSS-REFERENCE TO RELATED APPLICATIONS

This application is a continuation of International Application No. PCT/CN2022/076221, filed on Feb. 14, 2022, which claims priority to Chinese Patent Application No. 202110588809.0, filed on May 28, 2021. The disclosures of the aforementioned applications are hereby incorporated by reference in their entireties.

TECHNICAL FIELD

This application relates to the field of communication technologies, and in particular, to a data processing method and an apparatus.

BACKGROUND

In a wireless communication network, an extended reality (XR) technology has advantages such as a plurality of fields of view and strong interactivity and can provide a user with brand-new visual experience. Therefore, XR technologies have great application value and business potential. XR technologies includes technologies such as virtual reality (VR), augmented reality (AR), and mixed reality (MR), and can be widely applied to many fields such as entertainment, gaming, healthcare, advertising, industry, online education, and engineering.

XR data may be generally divided into data streams (also referred to as data layers) with different priorities for transmission. However, when data streams with different priorities are allocated to one transport block (TB) for transmission, a transmission failure of data with a low priority may cause a transmission timeout for data with a high priority, thus affecting overall experience of a user on the XR data.

SUMMARY

According to a first aspect, an embodiment of this application provides a data processing method. The method may be performed by a terminal, a radio access network device, a server, or a central controller, or may be performed by a component (for example, a processor, a chip, or a chip system) of a terminal, a radio access network device, a server, or a central controller, or may be implemented by using a logical module or software that can implement all or some functions of a radio access network device. The method includes: obtaining an input bit sequence, where the input bit sequence includes a first input bit sequence whose length is $A_1$ and a third input bit sequence whose length is $A_2+L_{CRC1}$, and the third input bit sequence includes a second input bit sequence whose length is $A_2$ and a first cyclic redundancy check (CRC) bit sequence that corresponds to the first input bit sequence and the second input bit sequence and whose length is $L_{CRC1}$, where $A_1$, $A_2$, and $L_{CRC1}$ are integers greater than 0. The method further includes obtaining $C_1$ first code blocks based on a maximum code block size K and the first input bit sequence, where each first code block includes one first bit segment in the first input bit sequence and a second CRC bit sequence that corresponds to the first bit segment and whose length is $L_{CRC2}$, and a size of each first code block is $K_1$, where K, $K_1$, $C_1$, and $L_{CRC2}$ are integers greater than 0, and $K_1 \leq K$; and obtaining $C_2$ second code blocks based on the maximum code block size K and the third input bit sequence, where each second code block includes one second bit segment in the third input bit sequence and a third CRC bit sequence that corresponds to the second bit segment and whose length is $L_{CRC3}$, and a size of each second code block is $K_2$, where $K_2$, $C_2$, and $L_{CRC3}$ are integers greater than 0, and $K_2 \leq K$. The method also includes performing encoding based on some or all of the $C_1$ first code blocks and the $C_2$ second code blocks to obtain an encoded bit sequence, and outputting the encoded bit sequence.

According to the foregoing method, to-be-transmitted data can be segmented into different code blocks (CBs), to mitigate impact of a transmission failure of a part of the to-be-transmitted data on another part of the to-be-transmitted data, thereby improving overall user experience in data reception.

It may be understood that the first input bit sequence and the second input bit sequence whose length is $A_1+A_2$ may also be sometimes referred to as a bit sequence corresponding to a transport block (TB), and $A_1+A_2=A$ may also be understood as a payload size corresponding to the TB.

With reference to the first aspect, in some implementations of the first aspect, the first input bit sequence and the second input bit sequence have different priorities, or it may be understood that the first input bit sequence and the second input bit sequence are of different importance.

For example, the first input bit sequence corresponds to a base-layer data stream, and the second input bit sequence corresponds to an enhancement-layer data stream; or the first input bit sequence corresponds to an enhancement-layer data stream, and the second input bit sequence corresponds to a base-layer data stream.

For another example, the first input bit sequence corresponds to a data stream within a field of view (FOV), and the second input bit sequence corresponds to a data stream outside the FOV; or the first input bit sequence corresponds to a data stream outside an FOV, and the second input bit sequence corresponds to a data stream within the FOV.

In the foregoing implementation, data of different importance levels can be segmented into different CBs, to mitigate impact of a transmission failure of low-importance data on high-importance data, thereby improving overall user experience on XR data.

With reference to the first aspect, in some implementations of the first aspect, an input bit sequence may be obtained by using the following steps: obtaining the first input bit sequence and the second input bit sequence, and generating the first CRC sequence based on the first input bit sequence and the second input bit sequence. For example, the first CRC bit sequence whose length is $L_{CRC1}$ is generated based on the first input bit sequence whose length is $A_1$ and the second input bit sequence whose length is $A_2$, where $L_{CRC1}$ is 6, 11, 16, or 24. In this implementation, the input bit sequence and the length of the CRC bit sequence corresponding to the input bit sequence may be obtained, so that different parts of the to-be-transmitted data are segmented into different CBs, to mitigate impact of a transmission failure of a part of the to-be-transmitted data on another part of the to-be-transmitted data.

With reference to the first aspect, in some implementations of the first aspect, $C_1$ and $C_2$ respectively satisfy:

$$C_1 = \left\lceil \frac{A_1}{K - L_{CRC2}} \right\rceil$$

-continued $$C_2 = \left\lceil \frac{A_2 + L_{CRC1}}{K - L_{CRC3}} \right\rceil$$

where ⌈ ⌉ means rounding up. Optionally, a total length $K'_1$ of a first bit segment and a second CRC bit sequence that are included in each first code block and a total length $K'_2$ of a second bit segment and a third CRC bit sequence that are included in each second code block respectively satisfy:

$$K'_1 = \left\lceil \frac{A_1 + C_1 \cdot L_{CRC2}}{C_1} \right\rceil \le K_1$$

$$K'_2 = \left\lceil \frac{A_2 + L_{CRC1} + C_2 \cdot L_{CRC3}}{C_2} \right\rceil \le K_2$$

In the foregoing implementation, the first input bit sequence may be evenly segmented as much as possible into first code blocks with substantially the same length, and the third input bit sequence may be evenly segmented as much as possible into second code blocks with substantially the same length, so as to simplify encoding and decoding, and to avoid the negative impact on encoding performance because some code blocks are excessively short.

With reference to the first aspect, in some implementations of the first aspect, $A_1\%\ C_1$ first code blocks in the $C_1$ first code blocks further include a first padding bit sequence whose length is $F_{11}$, and $C_1-A_1\%\ C_1$ first code blocks in the $C_1$ first code blocks further include a second padding bit sequence whose length is $F_{12}$, where $F_{11}$ and $F_{12}$ respectively satisfy:

$$F_{11} = K_1 - \left\lceil \frac{A_1 + C_1 \cdot L_{CRC2}}{C_1} \right\rceil$$

$$F_{12} = K_1 - \left\lfloor \frac{A_1 + C_1 \cdot L_{CRC2}}{C_1} \right\rfloor$$

where ⌊ ⌋ means rounding down, and % represents a modulo operation.

It may be understood that when $A_1\%\ C_1=0$, a length of a padding bit sequence included in each of the $C_1$ first code blocks is, $$K_1 - \frac{A_1 + C_1 \cdot L_{CRC2}}{C_1}.$$

That is, when $A_1\%\ C_1=0$, each of the $C_1$ first code blocks includes a padding bit sequence of the same length.

In the foregoing implementation, the size of the first code block is made to satisfy an input requirement of an actual encoder.

With reference to the first aspect, in some implementations of the first aspect, $(A_2+L_{CRC1})\%\ C_2$ second code blocks in the $C_2$ second code blocks further include a third padding bit sequence whose length is $F_{21}$, and $C_2-(A_2+L_{CRC1})\%\ C_2$ second code blocks in the $C_2$ second code blocks further include a fourth padding bit sequence whose length is $F_{22}$, where $F_{21}$ and $F_{22}$ respectively satisfy:

$$F_{21} = K_2 - \left\lceil \frac{A_2 + L_{CRC1} + C_2 \cdot L_{CRC3}}{C_2} \right\rceil$$

-continued $$F_{22} = K_2 - \left\lfloor \frac{A_2 + L_{CRC1} + C_2 \cdot L_{CRC3}}{C_2} \right\rfloor$$

It may be understood that when $(A_2+L_{CRC1})\%\ C_2=0$, a length of a padding bit sequence included in each of the $C_2$ second code blocks is $$K_2 - \frac{A_2 + L_{CRC1} + C_2 \cdot L_{CRC3}}{C_2}.$$

That is, when $(A_2+L_{CRC1})\%\ C_2=0$, each of the $C_2$ second code blocks includes a padding bit sequence of the same length.

In the foregoing implementation, the size of the second code block is made to satisfy an input requirement of an actual encoder.

With reference to the first aspect, in some implementations of the first aspect, when the method is performed by a terminal or a component of a terminal, the method further includes: receiving first indication information, where the first indication information indicates at least one of $A_1$ or $A_2$. When the method is performed by a radio access network device, a component (for example, a processor, a chip, or a chip system) of a radio access network device, or a logical module or software that can implement all or some functions of a radio access network device, the method further includes: sending first indication information, where the first indication information indicates at least one of $A_1$ or $A_2$. In a code block segmentation process, different parts of the to-be-transmitted data may be segmented into different CBs based on the value of $A_1$ or $A_2$, to mitigate the impact of a transmission failure of a part of the to-be-transmitted data on another part of the to-be-transmitted data.

Optionally, the first indication information may be included in downlink control information (DCI) or a radio resource control (RRC) message. The first indication information may indicate the value of $A_1$ or $A_2$, or indicate a proportion $\alpha$ of $A_1$ or $A_2$ in a payload size corresponding to the TB. In this implementation, $A_1$ or $A_2$ can be accurately indicated, so that code block segmentation is more accurate. The first indication information may also include an index corresponding to $A_1$ or $A_2$, and the index indicates a proportion $\beta$ of $A_1$ or $A_2$ in the payload size corresponding to the TB. In this implementation, a quantity of bits occupied by the first indication information can be reduced, to reduce signaling overheads.

With reference to the first aspect, in some implementations of the first aspect, $C_1$ first code blocks are grouped into $M_1$ first code block groups (CBGs), and $C_2$ second code blocks are grouped into $M_2$ second CBGs, where $M_1$ and $M_2$ are integers greater than 0. In this implementation, different parts of the to-be-transmitted data may be assembled into different CBGs, to mitigate the impact of retransmission caused by a transmission failure of a part of the to-be-transmitted data on retransmission timeout of another part of the data.

In a possible implementation of the first CBG and the second CBG, $M_1$ and $M_2$ respectively satisfy:

$$M_1 = \min(N_1, C_1)$$

-continued $$M_2 = \min(N_1, C_2)$$

where $N_1>0$ represents a first maximum quantity of CBGs. $N_1$ may be predefined, or may be configured by using an RRC message. This implementation may be understood as that a same maximum quantity of CBGs is configured for the first CBG and the second CBG.

Optionally, $C_1\%\ M_1$ first CBGs in the $M_1$ first CBGs each include $$\left\lceil \frac{C_1}{M_1} \right\rceil$$

first code blocks, $M_1-C_1\%\ M_1$ first CBGs in the $M_1$ first CBGs each include $$\left\lfloor \frac{C_1}{M_1} \right\rfloor$$

first code blocks, $C_2\%\ M_2$ second CBGs in the $M_2$ second CBGs each include $$\left\lceil \frac{C_2}{M_2} \right\rceil$$

second code blocks, and $M_2-C_2\%\ M_2$ second CBGs in the $M_2$ second CBGs each include $$\left\lfloor \frac{C_2}{M_2} \right\rfloor$$

second code blocks.

In the foregoing implementation of the first CBG and the second CBG, different parts of the to-be-transmitted data may be assembled into different CBGs, to mitigate the impact of retransmission caused by a transmission failure of a part of the to-be-transmitted data on retransmission timeout of another part of the data.

In another possible implementation of the first CBG and the second CBG, $M_1$ and $M_2$ respectively satisfy:

$$M_1 = \min(N_2, C_1)$$

$$M_2 = \min(N_3, C_2)$$

where $N_2>0$ and $N_3>0$ respectively represent the second maximum quantity of CBGs and the third maximum quantity of CBGs. $N_2$ and the $N_3$ may be predefined, or may be configured by using an RRC message. This implementation may be understood as that a maximum quantity of CBGs is configured for both the first CBG and the second CBG, and $N_2$ and $N_3$ may be the same or may be different.

Optionally, $C_1\%\ M_1$ first CBGs in the $M_1$ first CBGs each include $$\left\lceil \frac{C_1}{M_1} \right\rceil$$

first code blocks, $M_1-C_1\%\ M_1$ first CBGs in the $M_1$ first CBGs each include $$\left\lfloor \frac{C_1}{M_1} \right\rfloor$$

first code blocks, $C_2\%\ M_2$ second CBGs in the $M_2$ second CBGs each include $$\left\lceil \frac{C_2}{M_2} \right\rceil$$

second code blocks, and $M_2-C_2\%\ M_2$ second CBGs in the $M_2$ second CBGs each include $$\left\lfloor \frac{C_2}{M_2} \right\rfloor$$

second code blocks.

In the foregoing implementation of the first CBG and the second CBG, different parts of the to-be-transmitted data may be more flexibly assembled into different CBGs, to mitigate the impact of retransmission caused by a transmission failure of a part of the to-be-transmitted data on retransmission timeout of another part of the data.

According to a second aspect, an embodiment of this application provides an apparatus, to implement the method according to any one of the first aspect or the possible implementations of the first aspect. The apparatus includes a corresponding unit or module for performing the foregoing method. The unit or module included in the apparatus can be implemented by software and/or hardware. The apparatus may be, for example, a terminal or a radio access network device, or may be a chip, a chip system, or a processor that supports a terminal or a network device in implementing the foregoing method, or may be a logical module or software that can implement all or some functions of a radio access network device.

According to a third aspect, an embodiment of this application provides an apparatus, including a processor, where the processor is coupled to a memory, the memory is configured to store instructions, and when the instructions are executed by the processor, the apparatus is enabled to implement the method according to any one of the first aspect or the possible implementations of the first aspect.

According to a fourth aspect, an embodiment of this application provides a computer-readable storage medium, where the computer-readable storage medium stores instructions, and when the instructions are executed, a computer is enabled to perform the method according to any one of the first aspect or the possible implementations of the first aspect.

According to a fifth aspect, an embodiment of this application provides a computer program product, where the computer program product includes computer program code, and when the computer program code is run on a computer, the computer is enabled to perform the method according to any one of the first aspect or the possible implementations of the first aspect.

According to a sixth aspect, an embodiment of this application provides a chip, including a processor, where the processor is coupled to a memory, the memory is configured to store instructions, and when the instructions are executed by the processor, the chip is enabled to implement the method according to any one of the first aspect or the possible implementations of the first aspect.

According to a seventh aspect, an embodiment of this application provides a communication system, including: the apparatus according to the second aspect or the apparatus according to the third aspect.

According to an eighth aspect, an embodiment of this application provides a system, to implement the method according to any one of the first aspect or the possible implementations of the first aspect. The system includes a corresponding unit or module for performing the foregoing method. The unit or module included in the system can be implemented by software and/or hardware. The system may be, for example, a terminal or a radio access network device, or may be a chip, a chip system, or a processor that supports a terminal or a network device in implementing the foregoing method, or may be a logical module or software that can implement all or some functions of a radio access network device.

DESCRIPTION OF EMBODIMENTS

Figure 1:
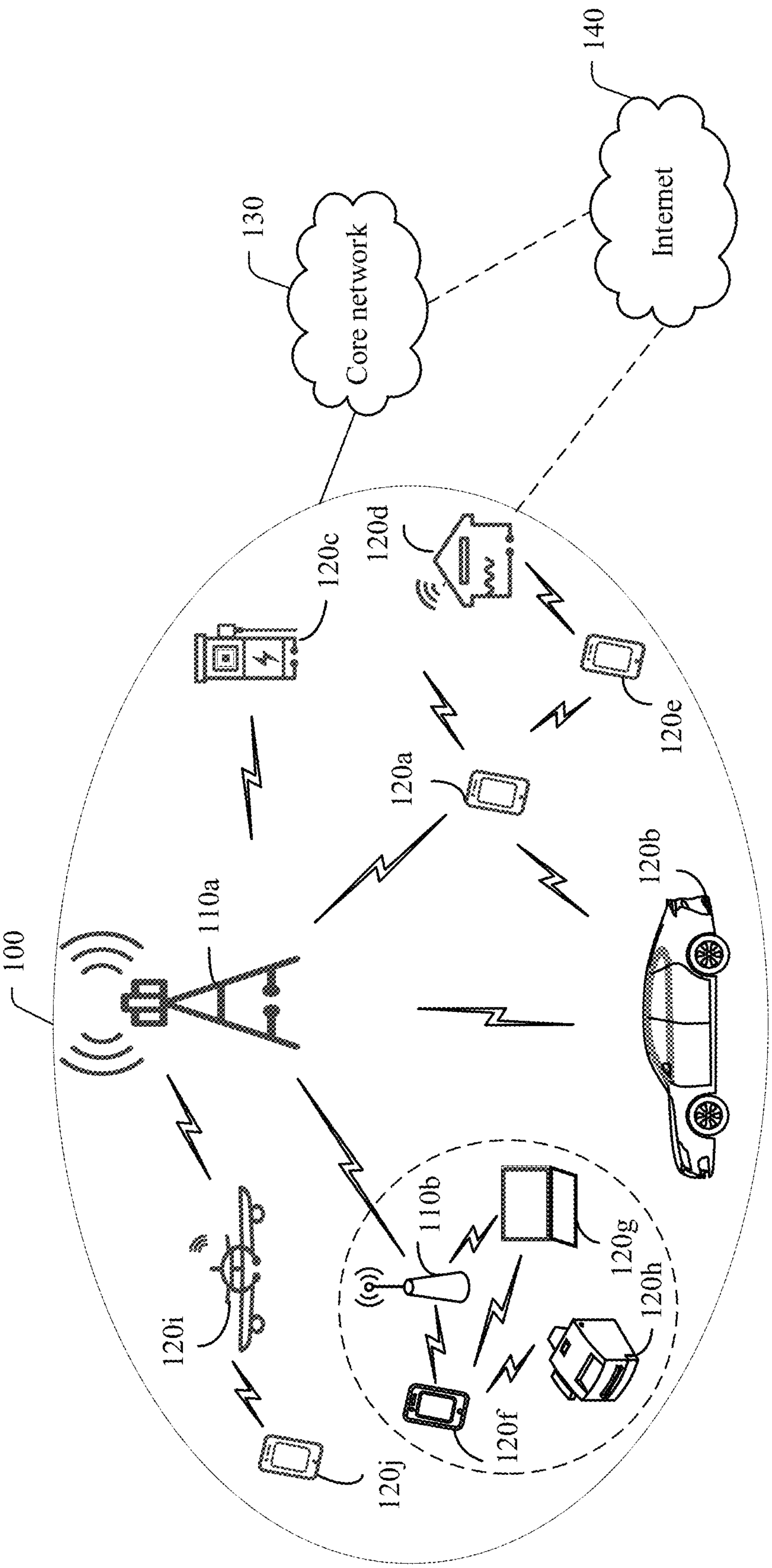
FIG. 1 is a schematic diagram of a communication system to which an embodiment of this application is applied.

FIG. 1 is a schematic diagram of an architecture of a communication system to which an embodiment of this application is applied. As shown in FIG. 1, the communication system includes a radio access network 100 and a core network 130. Optionally, the communication system may further include an internet 140. The radio access network 100 may include at least one radio access network device (for example, 110*a* and 110*b* in FIG. 1), and may further include at least one terminal (for example, 120*a* to 120*j* in FIG. 1). The terminal is connected to the radio access network device in a wireless manner, and the radio access network device is connected to the core network in a wireless or wired manner. The core network device and the radio access network device may be different independent devices, or functions of the core network device and logical functions of the radio access network device may be integrated into one device, or some functions of the core network device and some functions of the radio access network device may be integrated into one device. Terminals may be connected to each other in a wired or wireless manner; and radio access network devices may be connected to each other in a wired or wireless manner. FIG. 1 is merely a schematic diagram. The communication system may further include other network devices, for example, may further include a relay device and a backhaul device, which are not shown in FIG. 1.

The method and the apparatus provided in embodiments of this application may be applied to various communication systems, for example, a fourth generation (4th generation, 4G) communication system, a 4.5G communication system, a 5G communication system, a 5.5G communication system, a 6G communication system, a system integrating a plurality of communication systems, or a future evolved communication system. The communication systems include, for example, a long term evolution (LTE) system, a new radio (NR) system, a wireless fidelity (Wi-Fi) system, a communication system related to the 3rd generation partnership project (3GPP), and another communication system of this type.

The radio access network device may be a base station, an evolved NodeB (eNodeB), a transmission reception point (TRP), a next-generation NodeB (gNB) in a 5G mobile communication system, a next-generation base station in a 6G mobile communication system, a base station in a future mobile communication system, an access node in a Wi-Fi system, or the like, or may be a module or a unit that performs some functions of a base station, for example, may be a central unit (CU) or a distributed unit (DU). The radio access network device may be a macro base station (for example, 110*a* in FIG. 1), or may be a micro base station or an indoor base station (for example, 110*b* in FIG. 1), or may be a relay node or a donor node. It may be understood that all or some functions of the radio access network device in this application may also be implemented by using a software function running on hardware, or may be implemented by using an instantiated virtualization function on a platform (for example, a cloud platform). The embodiments of this application do not limit a specific technology or a specific device form that is used by the radio access network device. For ease of description, the following provides description by using an example in which a base station is used as a radio access network device.

The terminal may also be referred to as a terminal device, user equipment (UE), a mobile station, a mobile terminal, or the like. The terminal may be widely applied to various scenarios, for example, device-to-device (D2D), vehicle to everything (V2X) communication, machine-type communication (MTC), internet of things (IoT), virtual reality, augmented reality, industrial control, self-driving, telemedicine, smart grid, smart furniture, smart office, smart wearable, smart transportation, and smart city. The terminal may be a mobile phone, a tablet computer, a computer having a wireless transceiver function, a wearable device, a vehicle, an unmanned aerial vehicle, a helicopter, an airplane, a ship, a robot, a mechanic arm, a smart home device, or the like. The embodiments of this application do not limit a specific technology or a specific device form that is used by the terminal.

Alternatively, the terminal in this application may be a VR terminal, an AR terminal, or an MR terminal. The VR terminal, the AR terminal, and the MR terminal each may be referred to as an XR terminal. The XR terminal may be, for example, a head mounted device (for example, a helmet or a pair of glasses), may be an all-in-one machine, or may be a television, a display, a car, a vehicle-mounted device, a tablet, or a smart screen. The XR terminal can present XR data to a user, and the user can experience diversified XR services by wearing or using the XR terminal. The XR terminal may access a network in a wireless or wired manner, for example, by using Wi-Fi, 5G, or another system.

The base station and the terminal may be in fixed locations, or may be mobile. The base station and the terminal may be deployed on land, including an indoor or outdoor scenario and a handheld or vehicle-mounted scenario; may be deployed on water; or may be deployed on an airplane, a balloon, and a satellite in the air. The embodiments of this application do not limit application scenarios of the base station and the terminal.

Roles of the base station and the terminal may be relative. For example, an airplane or unmanned aerial vehicle 120*i* in FIG. 1 may be configured as a mobile base station. For a terminal 120*j* that accesses a radio access network 100 by using 120*i*, the terminal 120*i* is functioning as a base station. However, to the base station 110*a*, 120*i* is a terminal, that is, 110*a* and 120*i* communicate with each other by using a wireless air interface protocol. Certainly, 110*a* and 120*i* may also communicate with each other using an interface protocol between base stations. In this case, for 110*a*, 120*i* is a base station. Therefore, both the base station and the terminal may be collectively referred to as communication apparatuses. 110*a* and 110*b* in FIG. 1 may be referred to as communication apparatuses having a base station function, and 120*a* to 120*j* in FIG. 1 may be referred to as communication apparatuses having a terminal function.

Communication between a base station and a terminal, between base stations, and between terminals may be performed by using a licensed spectrum or an unlicensed spectrum, or both a licensed spectrum and an unlicensed spectrum. Communication may be performed by using a spectrum below 6 gigahertz (gigahertz, GHz), or may be performed by using a spectrum above 6 GHz, or may be performed by using a spectrum below 6 GHz and a spectrum above 6 GHz. The embodiments of this application do not limit a spectrum resource used for wireless communication.

In the embodiments of this application, a function of a base station may also be performed by a module (for example, a chip) in the base station, or may be performed by a control subsystem including a function of a base station. The control subsystem including a function of a base station may be a control center in the foregoing application scenarios of the terminal, such as smart grid, industrial control, smart transportation, and smart city. A function of a terminal may alternatively be performed by a module (for example, a chip or a modem) in the terminal, or may be performed by an apparatus including a function of a terminal.

In this application, a base station sends a downlink signal or downlink information to a terminal, where the downlink information is carried on a downlink channel. The terminal sends an uplink signal or uplink information to the base station, where the uplink information is carried on an uplink channel. A terminal may send a sidelink signal or sidelink information to another terminal, where the sidelink information is carried on a sidelink channel.

An XR technology has advantages such as a plurality of fields of view and strong interactivity, can provide a user with a brand-new visual experience, and therefore has great application value and business potential. An XR technology may refer to technologies such as VR, AR, and MR, and can be widely used in many fields such as entertainment, gaming, healthcare, advertising, industry, online education, and engineering. An VR technology is mainly used for rendering in visual and audio scenarios to emulate sensory stimulation of vision and audio in the real world to a user as much as possible. VR technologies generally require users to wear an XR terminal (for example, a head-mounted device) to simulate vision and/or hearing for the user. VR technologies may further perform action tracking on the users, to update simulated visual and/or auditory content in a timely manner. An AR technology is mainly to provide additional visual and/or auditory information or manually generated content in a real environment perceived by users. The users may directly (for example, sensing, processing, and rendering is not performed) or indirectly (for example, transfer is performed by using a sensor or the like) obtain the real environment, and further enhancement processing is performed on the real environment. An MR technology refers to technologies that to insert virtual elements into physical scenarios, to provide users with immersive experience by adding these elements as a part of a real scenario.

XR data may be generally divided into data streams (also referred to as data layers) with different priorities for transmission. However, when data streams with different priorities are allocated to one transport block (TB) for transmission, a transmission failure of data with a low priority causes a transmission timeout problem of data with a high priority, thereby affecting overall experience of a user on the XR data.

This application provides a data processing method. In the method, data of different priorities is segmented into different code blocks (CBs), to mitigate impact of a transmission failure of low-priority data on high-priority data, thereby improving overall experience of a user on XR data. It may be understood that the method provided in this application does not limit a data service type to which the method is applied, and a data service type other than the XR data is also applicable.

Embodiments provided in this application are applicable to a plurality of different scenarios. FIG. 2 to FIG. 5 are schematic diagrams of several system frameworks to which an embodiment of this application is applicable.

Figure 2:
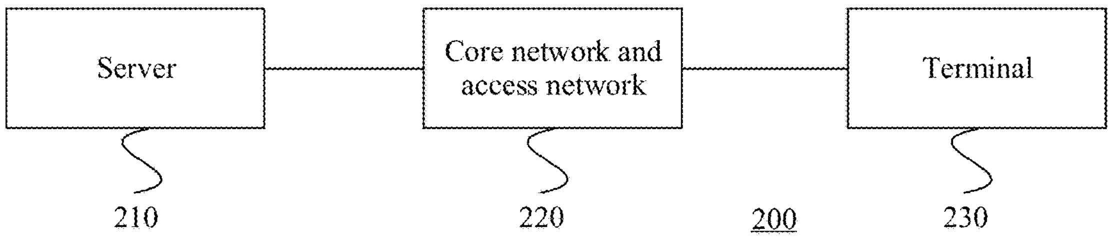
FIG. 2 to FIG. 5 are schematic diagrams of several system frameworks to which an embodiment of this application is applicable.

FIG. 2 is a schematic diagram of a scenario to which an embodiment of this application is applicable. FIG. 2 shows a system 200, including a server 210, a core network and access network 220 (which may be referred to as a transmission network 220, for example, an LTE, 5G, or 6G network), and a terminal 230. The server 210 may be configured to encode, decode, and render source XR data. The transmission network 220 may be configured to transmit XR data. The terminal 230 provides a user with diversified XR experience by processing the XR data. It may be understood that another apparatus may be further included between the transmission network 220 and the terminal 230, for example, another terminal (for example, a mobile phone, a notebook computer, or a vehicle-mounted terminal) and/or a network device (for example, a relay device, an integrated access backhaul (IAB) device, a Wi-Fi router, or a Wi-Fi access point) may be further included. The terminal 230 obtains XR data from the transmission network 220 by using another terminal and/or a network device.

Figure 3:
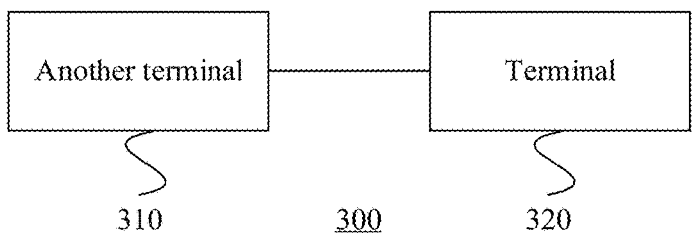

FIG. 3 is a schematic diagram of another scenario to which an embodiment of this application is applicable. FIG. 3 shows a system 300, including a terminal 320 and another terminal 310. The terminals 310 and 320 are different terminals. The terminal 310 may transmit XR data to the terminal 320. For example, the terminal 310 may project the XR data to the terminal 320. For another example, the terminal 310 and the terminal 320 are vehicle-mounted terminals, and XR data may be exchanged between the vehicle-mounted terminals. It may be understood that the terminal 310 may be further connected to a transmission network (for example, an LTE, 5G, or 6G network), to obtain XR data from the transmission network or send data to the transmission network.

Figure 4:
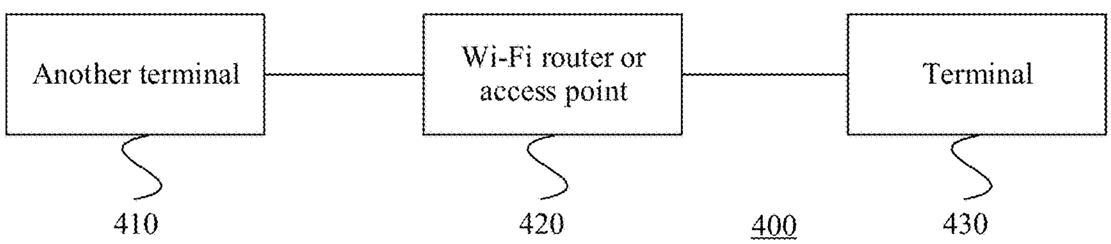

FIG. 4 is a schematic diagram of another scenario to which an embodiment of this application is applicable. FIG. 4 shows a system 400, including a terminal 430, a Wi-Fi router or a Wi-Fi access point 420 (which may be referred to as a Wi-Fi apparatus 420), and another terminal 410. The terminals 410 and 420 are different terminals. The terminal 410 may transmit XR data to the terminal 430 by using the Wi-Fi apparatus 420. For example, the terminal 410 is a mobile phone device; the Wi-Fi apparatus 420 is a Wi-Fi router, a Wi-Fi access point, or a set-top box; the terminal 430 is a television device, a smart screen device, or an electronic tablet device; and the mobile phone device may project the XR data to the television device, the smart screen device, or the electronic tablet device by using the Wi-Fi router, the Wi-Fi access point, or the set-top box, and present the XR data to a user.

Figure 5:
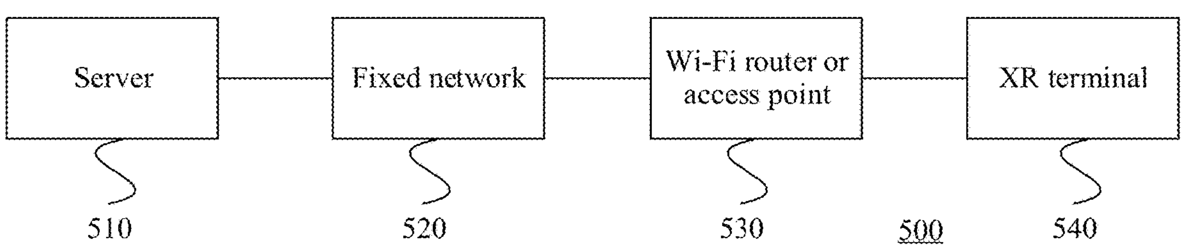

FIG. 5 is a schematic diagram of another scenario to which an embodiment of this application is applicable. FIG. 5 shows a system 500, including a server 510, a fixed network 520, a Wi-Fi router or a Wi-Fi access point 530 (which may be referred to as a Wi-Fi apparatus 530), and a terminal 540. The server 510 may be configured to encode, decode, and render source XR data, and transmit XR data to the terminal 540 by using the fixed network 520 and the Wi-Fi apparatus 530. For example, the fixed network 520 is an operator's network; the Wi-Fi apparatus 530 is a Wi-Fi router, a Wi-Fi access point, or a set-top box; and the server 510 transmits or projects the XR data to the terminal 540 by using the operator's network 520 and the Wi-Fi apparatus 530.

It may be understood that FIG. 2 to FIG. 5 are merely examples of several scenarios to which embodiments of this application are applicable, and do not limit the scenarios to which the embodiments of this application is applicable.

The following describes in detail technical solutions in this application with reference to accompanying drawings.

For ease of understanding embodiments of this application, some terms in this application are first briefly described in the following table.

TABLE 1

| | |
|---|---|
| $\lceil\ \rceil$ | Round-up |
| $\lfloor\ \rfloor$ | Round-down |
| x % y | Divides x by y to obtain a remainder of the division (it may also be understood as dividing x by y to obtain a modulo of the division). |
| min(x, y) | Obtains a smaller value in x and y. |

It may be understood that for rounding up or rounding down in an expression in this application, for a to-be-rounded parameter, if the parameter is an integer, the parameter may be not rounded up or rounded down, or the integer parameter may be rounded up, or the integer parameter may be rounded down, and a same final result is obtained.

Figure 6:
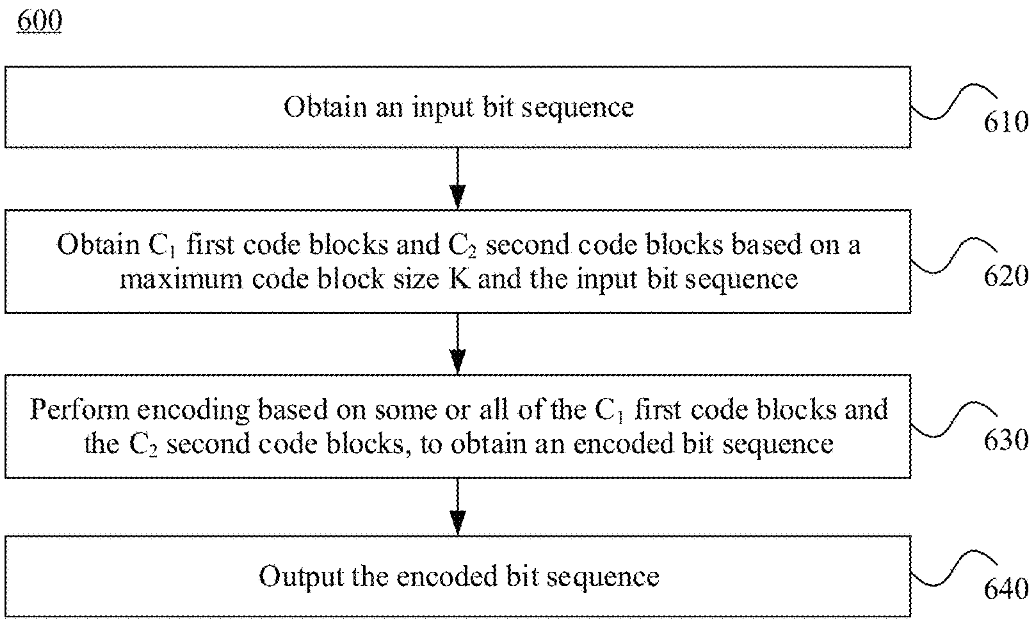
FIG. 6 is a schematic flowchart of a data processing method according to an embodiment of this application.

FIG. 6 is a schematic flowchart of a data processing method 600 according to an embodiment of this application. The method may be performed by a radio access network device or may be performed by a component (for example, a processor, a chip, or a chip system) of a radio access network device, or may be implemented by using a logical module or software that can implement all or some functions of a radio access network device. The method may be performed by a terminal, or may be performed by a component (for example, a processor, a chip, or a chip system) of the terminal. As shown in FIG. 6, the method 600 in this embodiment may include a part 610, a part 620, a part 630, and a part 640.

Part 610: Obtain an input bit sequence. The input bit sequence includes a first input bit sequence whose length is $A_1$ and a third input bit sequence whose length is $A_2+L_{CRC1}$, and the third input bit sequence includes a second input bit sequence whose length is $A_2$ and a first cyclic redundancy check (CRC) bit sequence that corresponds to the first input bit sequence and the second input bit sequence and whose length is $L_{CRC1}$, where $A_1$, $A_2$, and $L_{CRC1}$ are integers greater than 0.

Part 620: Obtain or construct $C_1$ first code blocks and $C_2$ second code blocks based on a maximum code block size K and the input bit sequence, where K, $C_1$, and $C_2$ are integers greater than 0.

Specifically, the $C_1$ first code blocks are obtained based on the maximum code block size K and the first input bit sequence. Each first code block includes one first bit segment in the first input bit sequence and a second CRC bit sequence that corresponds to the first bit segment and whose length is $L_{CRC2}$, and a size of each first code block is $K_1$, where $K_1$ and $L_{CRC2}$ are integers greater than 0, and $K_1 \leq K$. The $C_2$ second code blocks are obtained based on the maximum code block size K and the third input bit sequence. Each second code block includes one second bit segment in the third input bit sequence and a third CRC bit sequence that corresponds to the second bit segment and whose length is $L_{CRC3}$, and a size of each second code block is $K_2$, where $K_2$ and $L_{CRC3}$ are integers greater than 0, and $K_2 \leq K$. It may be understood that the maximum code block size K in this application may be a constraint on a code block size.

Part 630: Perform encoding based on some or all of the $C_1$ first code blocks and the $C_2$ second code blocks, to obtain an encoded bit sequence. For example, low density parity check (LDPC) encoding may be performed on some or all of the $C_1$ first code blocks and the $C_2$ second code blocks to obtain the encoded bit sequence.

Part 640: Output the encoded bit sequence. For example, the encoded bit sequence may be output to another processing module using a communication interface for processing such as rate matching and interleaving, and encoded bits obtained through interleaving may be further mapped into modulation symbols and sent to a device at a receive end.

According to the method 600, to-be-transmitted data can be segmented into different CBs, to mitigate the impact caused by a transmission failure of one part of the to-be-transmitted data on another part of the to-be-transmitted data, thereby improving overall user experience with XR technologies.

In a possible implementation of the method 600, the first input bit sequence and the second input bit sequence have different priorities, or it may be understood that the first input bit sequence and the second input bit sequence are of different importance.

For example, the first input bit sequence corresponds to a base-layer data stream, and the second input bit sequence corresponds to an enhancement-layer data stream; or the first input bit sequence corresponds to an enhancement-layer data stream, and the second input bit sequence corresponds to a base-layer data stream. The base-layer data stream and the enhancement-layer data stream may be data streams obtained by performing source encoding on source data, and the source encoding may be, for example, high efficiency video coding (HEVC) or scalable extension of HEVC (SHVC). The base-layer data stream corresponds to basic video picture content, and generally has a relatively low frame rate, resolution, or image quality. The enhancement-layer data stream corresponds to enhanced video picture content, and generally has a high frame rate, resolution, or image quality. A priority of the base-layer data stream is generally higher than that of the enhancement-layer data stream.

For another example, the first input bit sequence corresponds to a data stream within a field of view (field of view, FOV), and the second input bit sequence corresponds to a data stream outside the FOV; or the first input bit sequence corresponds to a data stream outside an FOV, and the second input bit sequence corresponds to a data stream within the FOV. The data stream within the FOV and the data stream outside the FOV may be data streams obtained by performing FOV source encoding on the source data. During FOV source encoding, the source data may be divided into a part within the field of view and a part outside the field of view. The FOV may be, for example, about 60 degrees to 150 degrees. The part within the field of view corresponds to the data stream within the FOV, and the part outside the field of view corresponds to the data stream outside the FOV. The data stream outside the FOV generally includes background data of a video. When the background data fails to be transmitted, problems such as a black border occur during video display, and a user would feel dizzy. Therefore, a priority of the background data of the data stream outside the FOV is generally higher than that of the data stream within the FOV.

In the foregoing implementation, data of different importance levels can be segmented into different CBs, to mitigate impact of a transmission failure of low-importance data on high-importance data, thereby improving overall experience of a user on XR data.

In a possible implementation of the part 610, the input bit sequence may be obtained by using the following method: obtaining the first input bit sequence and the second input bit sequence, and generating the first CRC sequence based on the first input bit sequence and the second input bit sequence. For example, the first CRC bit sequence whose length is $L_{CRC1}$ is generated based on the first input bit sequence whose length is $A_1$ and the second input bit sequence whose length is $A_2$, where $L_{CRC1}$ is 6, 11, 16, or 24. In this implementation, the input bit sequence and the length of the CRC bit sequence corresponding to the input bit sequence may be obtained, so that different parts of the to-be-transmitted data are segmented into different CBs, to mitigate impact of a transmission failure of a part of the to-be-transmitted data on another part of the to-be-transmitted data.

Figure 7:
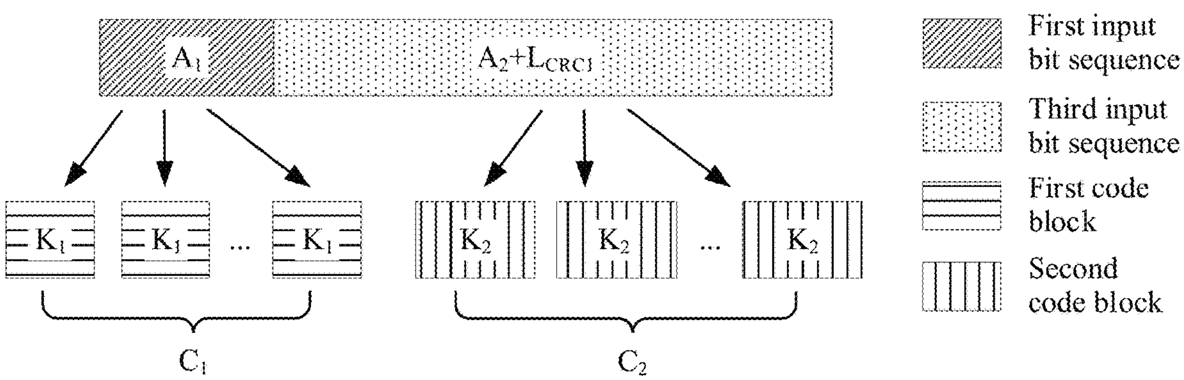
FIG. 7 is a schematic diagram of a code block segmentation method according to an embodiment of this application.

The following further describes the part 620 with reference to FIG. 7.

FIG. 7 shows a first input bit sequence whose length is $A_1$ and a third input bit sequence whose length is $A_2+L_{CRC1}$. The third input bit sequence includes a second input bit sequence whose length is $A_2$ and a first CRC bit sequence that corresponds to the first input bit sequence and the second input bit sequence and whose length is $L_{CRC1}$. The first input bit sequence and the second input bit sequence whose length is $A_1+A_2$ may also be sometimes understood as bit sequences corresponding to one TB. $A_1+A_2=A$ may also be understood as a payload size corresponding to the TB.

In the part 620, the obtaining of $C_1$ first code blocks based on the maximum code block size K and the first input bit sequence where a size of each first code block is $K_1$ may include: performing code block segmentation and code block CRC addition on the first input bit sequence based on the maximum code block size K, to obtain the $C_1$ first code blocks, where $C_1$ satisfies:

$$C_1=\left\lceil\frac{A_1}{K-L_{CRC2}}\right\rceil$$

Each first code block includes one first bit segment in the first input bit sequence and a second CRC bit sequence that corresponds to the first bit segment and whose length is $L_{CRC2}$, where $L_{CRC2}$ is 6, 11, 16, or 24. A total length $$K_1'$$

of the first bit segment and the second CRC bit sequence that are included in each first code block satisfies:

$$K_1'=\left\lceil\frac{A_1+C_1\cdot L_{CRC2}}{C_1}\right\rceil\le K_1$$

For example, when one first code block $$CB_1^{C1}$$

in the $C_1$ first code blocks is obtained, one first bit segment $$D_1^{C1}$$

is obtained from the first input bit sequence, and the second CRC bit sequence $$CRC_1^{C1}$$

is generated based on the first bit segment $$D_1^{C1},$$

to obtain the first code block $$CB_1^{C1}$$

that includes the first bit segment $$D_1^{C1}$$

and the second CRC bit sequence $$CRC_1^{C1}.$$

If $C_1>1$, when another first code block $$CB_2^{C1}$$

in the $C_1$ first code blocks is obtained, another first bit segment $$D_2^{C1}$$

is obtained from the first input bit sequence, and the second CRC bit sequence $$CRC_2^{C1}$$

is generated based on the first bit segment $$D_2^{C1},$$

to obtain the first code block $$CB_2^{C1}$$

that includes the first bit segment $$D_2^{C1}$$

and the second CRC bit sequence $$CRC_2^{C1}.$$

When $C_1>1$, $$D_1^{C1}$$

and $$D_2^{C1}$$

are two different bit segments in the first input bit sequence, or may be understood that $$D_1^{C1}$$

and $$D_2^{C1}$$

are two bit segments that do not overlap each other in the first input bit sequence.

In the foregoing implementation, the first input bit sequence may be evenly segmented as much as possible into first code blocks with substantially the same length, so as to simplify encoding and decoding, and to avoid performance degradation because some code blocks are excessively short.

Optionally, when $$K_1' < K_1,$$

each first code block further includes a padding bit sequence. A function of the padding bit sequence is to pad the first code block to ensure that a size of the first code block is $K_1$, so that the size of the first code block satisfies an input requirement of an encoder. It may be understood that this application does not limit a specific value of each bit in the padding bit sequence.

In a possible implementation of the padding bit sequence in the first code block, $A_1\%\ C_1$ first code blocks in the $C_1$ first code blocks further include a first padding bit sequence whose length is $F_{11}$, and $C_1-A_1\%\ C_1$ first code blocks in the $C_1$ first code blocks further include a second padding bit sequence whose length is $F_{12}$, where $F_{11}$ and $F_{12}$ respectively satisfy:

$$F_{11} = K_1 - \left\lceil \frac{A_1 + C_1 \cdot L_{CRC2}}{C_1} \right\rceil$$

$$F_{12} = K_1 - \left\lfloor \frac{A_1 + C_1 \cdot L_{CRC2}}{C_1} \right\rfloor$$

It may be understood that when $A_1\%\ C_1=0$, a length of a padding bit sequence included in each of the $C_1$ first code blocks is $$K_1 - \frac{A_1 + C_1 \cdot L_{CRC2}}{C_1}.$$

That is, when $A_1\%\ C_1=0$, each of the $C_1$ first code blocks includes a padding bit sequence of the same length.

It may be understood that when $$K_1' = K_1,$$

the first code block does not include a padding bit sequence.

In the foregoing implementation, the size of the first code block can satisfy an input requirement of an actual encoder.

In the part 620, the obtaining of $C_2$ second code blocks based on the maximum code block size K and the third input bit sequence where a size of each second code block is $K_2$ may include: performing code block segmentation and code block CRC addition on the third input bit sequence based on the maximum code block size K, to obtain the $C_2$ second code blocks, where $C_2$ satisfies:

$$C_2 = \left\lceil \frac{A_2 + L_{CRC1}}{K - L_{CRC3}} \right\rceil$$

Each second code block includes a second bit segment in the third input bit sequence and a third CRC bit sequence that corresponds to the second bit segment and whose length is $L_{CRC3}$, where $L_{CRC3}$ is 6, 11, 16, or 24. A total length $$K_2'$$

of the second bit segment and the third CRC bit sequence that are included in each second code block satisfies:

$$K_2' = \left\lceil \frac{A_2 + L_{CRC1} + C_2 \cdot L_{CRC3}}{C_2} \right\rceil \le K_2$$

For example, when one second code block $$CB_1^{C2}$$

in the $C_2$ second code blocks is obtained, one second bit segment $$D_1^{C2}$$

is obtained from the third input bit sequence, and the third CRC bit sequence $$CRC_1^{C2}$$

is generated based on the second bit segment $$D_1^{C2},$$

to obtain the second code block $$CB_1^{C2}$$

that includes the second bit segment $$D_1^{C2}$$

and the third CRC bit sequence $$CRC_1^{C2}.$$

If $C_2>1$, when another second code block $$CB_2^{C2}$$

in the $C_2$ second code blocks is obtained, another second bit segment $$D_2^{C2}$$

is obtained from the third input bit sequence, and the third CRC bit sequence $$CRC_2^{C2}$$

is generated based on the second bit segment $$D_2^{C2},$$

to obtain the second code block $$CB_2^{C2}$$

that includes the second bit segment $$D_2^{C2}$$

and the third CRC bit sequence $$CRC_2^{C2}.$$

When $C_2>1$, $$D_1^{C2}$$

and $$D_2^{C2}$$

are two different bit segments in the third input bit sequence, or may be understood that $$D_1^{C2}$$

and $$D_2^{C2}$$

are two bit segments that do not overlap each other in the third input bit sequence.

In the foregoing implementation, the third input bit sequence may be evenly segmented as much as possible into second code blocks with substantially the same length, so as to simplify encoding and decoding, and avoid performance degradation because some code blocks are excessively short.

Optionally, when $$K_2' < K_2,$$

each second code block further includes a padding bit sequence. A function of the padding bit sequence is to pad the second code block to ensure that a size of the second code block is $K_2$, so that the size of the second code block satisfies an input requirement of an encoder. It may be understood that this application does not limit a specific value of each bit in the padding bit sequence.

In a possible implementation of the padding bit sequence in the second code block, $(A_2+L_{CRC1})\%\ C_2$ second code blocks in the $C_2$ second code blocks further include a third padding bit sequence whose length is $F_{21}$, and $C_2-(A_2+L_{CRC1})\%\ C_2$ second code blocks in the $C_2$ second code blocks further include a fourth padding bit sequence whose length is $F_{22}$, where $F_{21}$ and $F_{22}$ respectively satisfy:

$$F_{21} = K_2 - \left\lceil \frac{A_2 + L_{CRC1} + C_2 \cdot L_{CRC3}}{C_2} \right\rceil$$

$$F_{22} = K_2 - \left\lfloor \frac{A_2 + L_{CRC1} + C_2 \cdot L_{CRC3}}{C_2} \right\rfloor$$

It may be understood that when $(A_2+L_{CRC1})\%\ C_2=0$, a length of a padding bit sequence included in each of the $C_2$ second code blocks is $$K_2 - \frac{A_2 + L_{CRC1} + C_2 \cdot L_{CRC3}}{C_2}.$$

That is, when $(A_2+L_{CRC1})\%\ C_2=0$, each of the $C_2$ second code blocks includes a padding bit sequence of the same length.

It may be understood that when $$K_2' = K_2,$$

the second code block does not include a padding bit sequence.

In the foregoing implementation, the size of the second code block can satisfy an input requirement of an actual encoder.

In the part 620, values of K, $K_1$, and $K_2$ may be related to an encoding scheme. For example, when LDPC encoding is used in the part 630, the values of K, $K_1$, and $K_2$ are related to a base graph corresponding to an LDPC encoding matrix.

The LDPC encoding matrix may be obtained based on a base graph (BG). The BG may generally include m*n matrix elements (4≤m≤46, 26≤n≤68), and may be represented in a form of a matrix with m rows and n columns, where a value of each matrix element is 0 or 1. An element whose value is 0 is sometimes referred to as a zero element, and an element whose value is 1 is sometimes referred to as a non-zero element.

A BG used for encoding the first code block may be represented as $BG_{c1}$. An element whose value is 0 may be replaced with a zero matrix (zero matrix) of $Z_1*Z_1$, and an element whose value is 1 may be replaced with a circulant permutation matrix of $Z_1*Z_1$. $Z_1$ is a positive integer, and may also be referred to as a first lifting (lifting) factor. If a value of an element in an $i^{th}$ row and a $j^{th}$ column in the $BG_{c1}$ is 1, the element corresponds to an offset value $$V_{i,j}^{c1},$$

where $$V_{i,j}^{c1}$$

is an integer greater than or equal to 0. An element whose value is 1 in the $i^{th}$ row and the $j^{th}$ column in the $BG_{c1}$ may be replaced with a circulant permutation matrix of $Z_1*Z_1$ that corresponds to $$P_{i,j}^{c1},$$

and the circulant permutation matrix may be obtained by performing right cyclic shift on an identity matrix of $Z_1*Z_1$ for $$P_{i,j}^{c1}$$

times, where $$P_{i,j}^{c1} = V_{i,j}^{c1}\% Z_1.$$

A BG used for encoding the second code block may be represented as $BG_{c2}$. An element whose value is 0 may be replaced with a zero matrix of $Z_2*Z_2$, and an element whose value is 1 may be replaced with a circulant permutation matrix of $Z_2*Z_2$. $Z_2$ is a positive integer, and may also be referred to as a second lifting factor. If a value of an element in an $i^{th}$ row and a $j^{th}$ column in the $BG_{c2}$ is 1, the element corresponds to an offset value $$V_{i,j}^{c2},$$

where $$V_{i,j}^{c2}$$

is an integer greater than or equal to 0. An element whose value is 1 in the $i^{th}$ row and the $j^{th}$ column in the $BG_{c2}$ may be replaced with a circulant permutation matrix of $Z_2*Z_2$ that corresponds to $$P^{c2}_{i,j},$$

and the circulant permutation matrix may be obtained by performing right cyclic shift on an identity matrix of $Z_2*Z_2$ for $$P^{c2}_{i,j}$$

times, where $$P^{c2}_{i,j} = V^{c2}_{i,j}\% \ Z_2.$$

There may be different BGs in LDPC encoding, and a specific BG used for encoding may be generally determined based on a bit rate and a data volume size (for example, a TB size). The following provides description by using an example in which there are two types of BGs in LDPC encoding: a BG1 and a BG2.

For example, a relationship between a value of K and the BG1 and the BG2 may be shown in the following table.

TABLE 2

| Base graph | Value of K |
|---|---|
| BG1 | 8448 |
| BG2 | 3840 |

For example, a relationship between values of $K_1$ and $K_2$ and the BG1 and the BG2 may be shown in the following table.

TABLE 3

| Base graph | Value of $K_1$ | Value of $K_2$ |
|---|---|---|
| BG1 | $22*Z_1$ | $22*Z_2$ |
| BG2 | $10*Z_1$ | $10*Z_2$ |

A value of the first lifting factor $Z_1$ is a minimum Z value that satisfies $$K_b \cdot Z \geq K_1'$$

in the Z values shown in Table 4, and a value of the second lifting factor $Z_2$ is a minimum Z value that satisfies $$K_b \cdot Z \geq K_2'$$

in the Z values shown in Table 4.

TABLE 4

| Set index | Set of Z |
|---|---|
| 0 | {2, 4, 8, 16, 32, 64, 128, 256} |
| 1 | {3, 6, 12, 24, 48, 96, 192, 384} |
| 2 | {5, 10, 20, 40, 80, 160, 320} |
| 3 | {7, 14, 28, 56, 112, 224} |
| 4 | {9, 18, 36, 72, 144, 288} |
| 5 | {11, 22, 44, 88, 176, 352} |
| 6 | {13, 26, 52, 104, 208} |
| 7 | {15, 30, 60, 120, 240} |

A value of $K_b$ is related to the BG, or is related to the BG and the length $A_1+A_2+L_{CRC1}$ of the first input bit sequence and the third input bit sequence. For example, the value of $K_b$ may satisfy the illustration shown in Table 5.

TABLE 5

| Base graph | Value of $K_b$ |
|---|---|
| BG1 | 22 |
| BG2 | 10, when $A_1 + A_2 + L_{CRC1} > 640$ |
| | 9, when $560 < A_1 + A_2 + L_{CRC1} \leq 640$ |
| | 8, when $192 < A_1 + A_2 + L_{CRC1} \leq 560$ |
| | 6, when $0 < A_1 + A_2 + L_{CRC1} \leq 192$ |

In the foregoing implementation, the value of $K_b$ may be obtained, the first lifting factor $Z_1$ and the second lifting factor $Z_2$ are obtained through calculation after querying Table 4, and a size $K_1$ of the first code block and a size $K_2$ of the second code block are finally determined; and different parts of to-be-transmitted data are segmented into different CBs based on $K_1$ and $K_2$, to mitigate impact of a transmission failure of a part of the to-be-transmitted data on another part of the to-be-transmitted data.

Optionally, the method 600 further includes: determining, based on the length $A_1$ of the first input bit sequence, the length $A_2$ of the second input bit sequence, and the bit rate R, a BG used for encoding.

In a possible implementation of determining the BG, it is determined, based on a total length $A_1+A_2$ of the first input bit sequence and the second input bit sequence and the bit rate R, that the BG used for encoding in the part 630 is the BG1 or the BG2. In this implementation, the $BG_{c1}$ used for encoding the first code block is the same as the $BG_{c2}$ used for encoding the second code block, that is, the $BG_{c1}$ and the $BG_{c2}$ are the BG1, or the $BG_{c1}$ and the $BG_{c2}$ are the BG2. For example, when $A_1+A_2 \leq 292$, or when $A_1+A_2 \leq 3824$ and $R \leq 0.67$, or when $R \leq 0.25$, the BG2 is used; otherwise, the BG1 is used. In this implementation, implementation of encoding and decoding can be simplified.

In another possible implementation of determining the BG, it is determined, based on the length $A_1$ of the first input bit sequence and the code rate R, that the BG used for encoding the first code block is the BG1 or the BG2, and it is determined, based on the length $A_2$ of the second input bit sequence and the code rate R, that the BG used for encoding the second code block is the BG1 or the BG2. In this implementation, the $BG_{c1}$ used for encoding the first code block may be the same as or different from the $BG_{c2}$ used for encoding the second code block. In this implementation, payload sizes and bit rates corresponding to different data can be processed more flexibly and effectively, thereby improving encoding efficiency.

Optionally, when the method 600 is performed by a terminal or a component (for example, a processor, a chip, or a chip system) of a terminal, the method 600 further includes: receiving first indication information, where the first indication information indicates at least one of $A_1$ or $A_2$. When the method 600 is performed by a radio access network device or a component (for example, a processor, a chip, or a chip system) of a radio access network device, or implemented by using a logical module or software that can implement all or some functions of a radio access network device, the method 600 further includes: sending first indication information, where the first indication information indicates at least one of $A_1$ or $A_2$. In this method, a value of $A_1$ or $A_2$ may be obtained. In a code block segmentation process, different parts of the to-be-transmitted data may be segmented into different CBs based on the value of $A_1$ or $A_2$, to mitigate impact of a transmission failure of a part of the to-be-transmitted data on another part of the to-be-transmitted data.

The first indication information may be included in downlink control information (DCI) or a radio resource control (RRC) message.

In a first possible implementation of the first indication information, the first indication information indicates a value of $A_1$ or $A_2$. For example, the first indication information may indicate the value of $A_1$, and it may be obtained, based on the value of $A_1$ and a payload size A corresponding to a TB, that the value of $A_2$ satisfies $A_2=A-A_1$; or the first indication information may indicate the value of $A_2$, and it may be obtained, based on the value of $A_2$ and a payload size A corresponding to a TB, that the value of $A_1$ satisfies $A_1=A-A_2$. In this implementation, $A_1$ or $A_2$ can be accurately indicated, so that code block segmentation is more accurate.

In a second possible implementation of the first indication information, the first indication information indicates a proportion $\alpha$ of $A_1$ or $A_2$ in a payload size corresponding to a TB. For example, the first indication information may indicate a proportion $\alpha$ of $A_1$ in the payload size A corresponding to the TB, and it may be determined, based on the proportion $\alpha$ and the payload size A corresponding to the TB, that the value of $A_1$ satisfies $A_1=A\cdot\alpha$ and the value of $A_2$ satisfies $A_2=A-A_1$; or the first indication information may indicate a proportion $\alpha$ of $A_2$ in the payload size A corresponding to the TB, and it may be determined, based on the proportion $\alpha$ and the payload size A corresponding to the TB, that the value of $A_2$ satisfies $A_2=A\cdot\alpha$ and the value of $A_1$ satisfies $A_1=A-A_2$. In this implementation, $A_1$ or $A_2$ can be accurately indicated, so that code block segmentation is more accurate.

In a third possible implementation of the first indication information, the first indication information includes an index corresponding to $A_1$ or $A_2$, and the index indicates a proportion of $\beta$ $A_1$ or $A_2$ in the payload size corresponding to the TB. For example, the first indication information may indicate an index corresponding to $A_1$, the index indicates a proportion $\beta$ of $A_1$ in the payload size A corresponding to the TB, and it may be determined, based on the proportion $\beta$ and the payload size A corresponding to the TB, that the value of $A_1$ satisfies $A_1=A\cdot\beta$ and the value of $A_2$ satisfies $A_2=A-A_1$; or the first indication information may indicate an index corresponding to $A_2$, the index indicates a proportion $\beta$ of $A_2$ in the payload size A corresponding to the TB, and it may be determined, based on the proportion $\beta$ and the payload size A corresponding to the TB, that the value of $A_2$ satisfies $A_2=A\cdot\beta$ and the value of $A_1$ satisfies $A_1=A-A_2$. In this implementation, a quantity of bits occupied by the first indication information can be reduced, to reduce signaling overheads.

The following describes the solution in the foregoing implementation of this application by using an example in which $A_1=25000$, $A_2=75000$, $L_{CRC1}=L_{CRC2}=L_{CRC3}=24$, the first code block and the second code block are coded by using the BG1, K=8448, $K_1=22*Z_1$, $K_2=22*Z_2$, and $K_b=22$.

In the part 610, an input bit sequence whose length is $A_1+A_2+L_{CRC1}$ is obtained, where the input bit sequence includes a first input bit sequence whose length is $A_1$ and a third input bit sequence whose length is $A_2+L_{CRC1}$. A payload size corresponding to the TB is $A=A_1+A_2=100000$.

$A_1$ or $A_2$ may be indicated by the first indication information. For example, the first indication information may indicate a value of $A_1$ or $A_2$, or may indicate a proportion $\alpha$ of $A_1$ or $A_2$ in the payload size corresponding to the TB, or may indicate an index corresponding to $A_1$ or $A_2$, where the index corresponds to a proportion $\beta$ of $A_1$ or $A_2$ in the payload size corresponding to the TB.

In the part 620, the $C_1$ first code blocks are obtained based on a maximum code block size K=8448 and a first input bit sequence whose length is $A_1=25000$, where $C_1$ satisfies:

$$C_1 = \left\lceil \frac{A_1}{K - L_{CRC2}} \right\rceil = 3$$

A size $$K_1'$$

of each first code block satisfies:

$$K_1' = \left\lceil \frac{A_1 + C_1 \cdot L_{CRC2}}{C_1} \right\rceil = 8358$$

With reference to Table 4, the minimum value of Z that satisfies $$K_b \cdot Z \geq K_1',$$

that is, 384, is used as $Z_1$ ($Z_1=384$). Then $K_1=22*Z_1=8448$.

The $C_2$ second code blocks are obtained based on a maximum code block size K=8448 and a third input bit sequence whose length is $A_2+L_{CRC1}=75000+24$, where $C_2$ satisfies:

$$C_2 = \left\lceil \frac{A_2 + L_{CRC1}}{K - L_{CRC3}} \right\rceil = 9$$

A size $$K_2'$$

of each second code block satisfies:

$$K_2' = \left\lceil \frac{A_2 + L_{CRC1} + C_2 \cdot L_{CRC3}}{C_2} \right\rceil = 8360$$

With reference to Table 4, the minimum value of Z that satisfies $$K_b \cdot Z \geq K_2',$$

that is, 384, is used as $Z_2$ ($Z_2$=384). Then $K_2$=22*$Z_2$=8448.

Because $$K_1' < K_1,$$

each of the $C_1$=3 first code blocks further includes a padding bit sequence. $A_1$% $C_1$=1 first code block further includes a first padding bit sequence whose length is $F_{11}$, and $C_1$−$A_1$% $C_1$=2 first code blocks further include a second padding bit sequence whose length is $F_{12}$, where $F_{11}$ and $F_{12}$ respectively satisfy:

$$F_{11} = K_1 - \left\lceil \frac{A_1 + C_1 \cdot L_{CRC2}}{C_1} \right\rceil = 90$$

$$F_{12} = K_1 - \left\lfloor \frac{A_1 + C_1 \cdot L_{CRC2}}{C_1} \right\rfloor = 91$$

Because $$K_2' < K_2,$$

each of the $C_2$=9 second code blocks further includes a padding bit sequence. Because ($A_2$+$L_{CRC1}$)% $C_2$=0, a length of the padding bit sequence included in each of the $C_2$=9 second code blocks is $$K_2 - \frac{A_2 + L_{CRC1} + C_2 \cdot L_{CRC3}}{C_2} = 88.$$

Optionally, in the method 600, $C_1$ first code blocks are grouped into $M_1$ first code block groups (CBGs), and $C_2$ second code blocks are grouped into $M_2$ second CBGs, where $M_1$ and $M_2$ are integers greater than 0. In this implementation, different parts of the to-be-transmitted data may be assembled into different CBGs, to mitigate impact of retransmission caused by a transmission failure of a part of the to-be-transmitted data on retransmission timeout of another part of the data.

In a possible implementation of the first CBG and the second CBG, $M_1$ and $M_2$ respectively satisfy:

$$M_1 = \min(N_1, C_1)$$

$$M_2 = \min(N_1, C_2)$$

where $N_1$>0 represents a first maximum quantity of CBGs. $N_1$ may be predefined, or may be configured by using an RRC message. This implementation may be understood as that a same maximum quantity of CBGs is configured for the first CBG and the second CBG.

For example, when the method 600 is performed by a terminal or a component (for example, a processor, a chip, or a chip system) of a terminal, the method 600 further includes: receiving first configuration information, where the first configuration information is used to configure a first maximum quantity $N_1$ of CBGs. When the method 600 is performed by a radio access network device or a component (for example, a processor, a chip, or a chip system) of a radio access network device, or implemented by using a logical module or software that can implement all or some functions of a radio access network device, the method 600 further includes: sending first configuration information, where the first configuration information is used to configure a first maximum quantity $N_1$ of CBGs. The first configuration information may be carried in an RRC message.

Optionally, $C_1$% $M_1$ first CBGs in the $M_1$ first CBGs each include $$\left\lceil \frac{C_1}{M_1} \right\rceil$$

first code blocks, $M_1$−$C_1$% $M_1$ first CBGs in the $M_1$ first CBGs each include $$\left\lfloor \frac{C_1}{M_1} \right\rfloor$$

first code blocks, $C_2$% $M_2$ second CBGs in the $M_2$ second CBGs each include $$\left\lceil \frac{C_2}{M_2} \right\rceil$$

second code blocks, and $M_2$−$C_2$% $M_2$ second CBGs in the $M_2$ second CBGs each include $$\left\lfloor \frac{C_2}{M_2} \right\rfloor$$

second code blocks.

Figure 8:
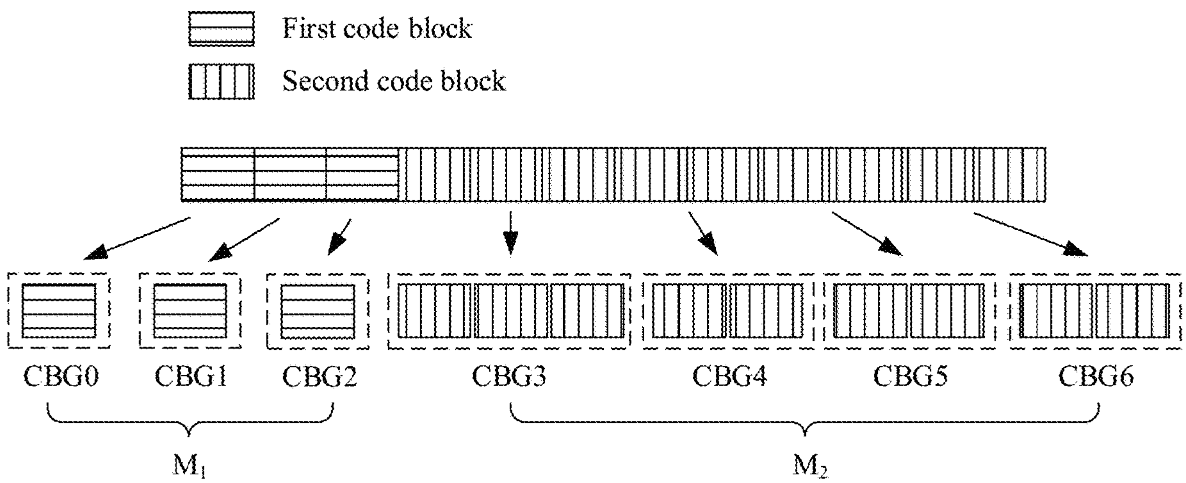
FIG. 8 and FIG. 9 are schematic diagrams of two types of code block groups according to an embodiment of this application.

The following uses an example in which $N_1$=4, $C_1$=3, and $C_2$=9 to describe implementations of the first CBG and the second CBG with reference to FIG. 8. As shown in FIG. 8, a quantity $M_1$ of first CBGs and a quantity $M_2$ of second CBGs respectively satisfy:

$$M_1 = \min(N_1, C_1) = 3$$

$$M_2 = \min(N_1, C_2) = 4$$

In this case, because $C_1$% $M_1$=0, each of the $M_1$=3 first CBGs (CBG0, CBG1, and CBG2) includes $$\left\lfloor \frac{C_1}{M_1} \right\rfloor = 1$$

first code block; and $C_2$% $M_2$=1 second CBG (CBG3) includes $$\left\lceil \frac{C_2}{M_2} \right\rceil = 3$$

second code blocks, and $M_2 - C_2\% M_2 = 3$ second CBGs (CBG4, CBG5, and CBG6) each include $$\left\lfloor \frac{C_2}{M_2} \right\rfloor = 2$$

second code blocks.

In the foregoing implementation of the first CBG and the second CBG, different parts of the to-be-transmitted data may be assembled into different CBGs, to mitigate impact of retransmission caused by a transmission failure of a part of the to-be-transmitted data on retransmission timeout of another part of the data.

In another possible implementation of the first CBG and the second CBG, $M_1$ and $M_2$ respectively satisfy:

$$M_1 = \min(N_2, C_1)$$

$$M_2 = \min(N_3, C_2)$$

where $N_2 > 0$ and $N_3 > 0$ respectively represent the second maximum quantity of CBGs and the third maximum quantity of CBGs. $N_2$ and the $N_3$ may be predefined, or may be configured by using an RRC message. This implementation may be understood as that a maximum quantity of CBGs is configured for both the first CBG and the second CBG, and $N_2$ and $N_3$ may be the same or may be different.

For example, when the method 600 is performed by a terminal or a component (for example, a processor, a chip, or a chip system) of a terminal, the method 600 further includes: receiving second configuration information, where the second configuration information is used to configure a second maximum quantity $N_2$ of CBGs and a third maximum quantity $N_3$ of CBGs. When the method 600 is performed by a radio access network device or a component (for example, a processor, a chip, or a chip system) of a radio access network device, or implemented by using a logical module or software that can implement all or some functions of the radio access network device, the method 600 further includes: sending second configuration information, where the second configuration information is used to configure a second maximum quantity $N_2$ of CBGs and a third maximum quantity $N_3$ of CBGs. The second configuration information may be carried in an RRC message.

Optionally, $C_1\% M_1$ first CBGs in the $M_1$ first CBGs each include $$\left\lceil \frac{C_1}{M_1} \right\rceil$$

first code blocks, $M_1 - C_1\% M_1$ first CBGs in the $M_1$ first CBGs each include $$\left\lfloor \frac{C_1}{M_1} \right\rfloor$$

first code blocks, $C_2\% M_2$ second CBGs in the $M_2$ second CBGs each include $$\left\lceil \frac{C_2}{M_2} \right\rceil$$

second code blocks, and $M_2 - C_2\% M_2$ second CBGs in the $M_2$ second CBGs each include $$\left\lfloor \frac{C_2}{M_2} \right\rfloor$$

second code blocks.

Figure 9:
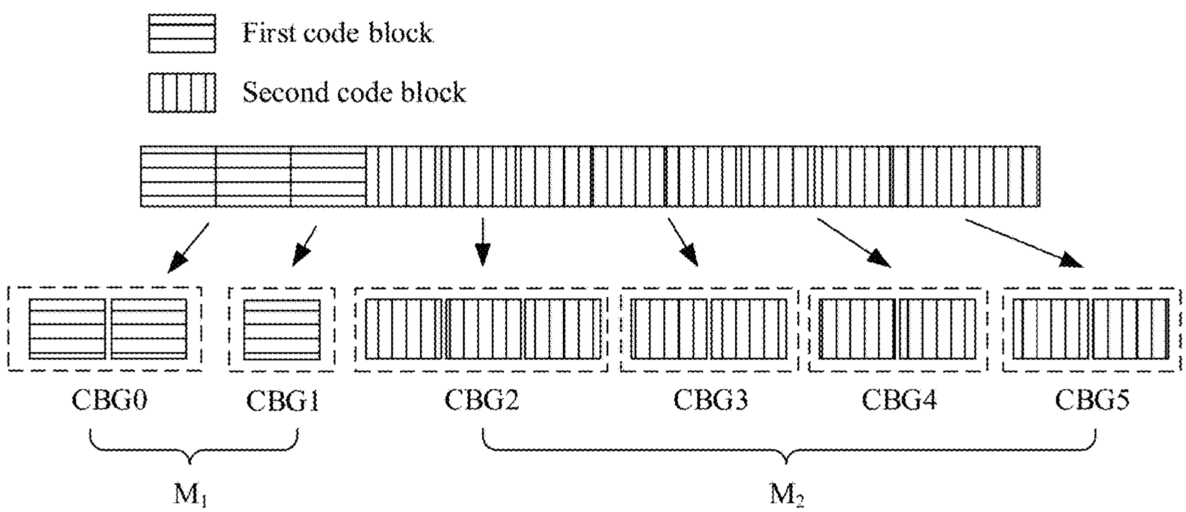

The following uses an example in which $N_2=2$, $N_3=4$, $C_1=3$, and $C_2=9$ to describe implementations of the first CBG and the second CBG with reference to FIG. 9. As shown in FIG. 9, a quantity $M_1$ of first CBGs and a quantity $M_2$ of second CBGs respectively satisfy:

$$M_1 = \min(N_2, C_1) = 2$$

$$M_2 = \min(N_3, C_2) = 4$$

In this case, $C_1\% M_1 = 1$ first CBG (CBG0) includes $$\left\lceil \frac{C_1}{M_1} \right\rceil = 2$$

first code block, $M_1 - C_1\% M_1 = 1$ first CBG (CBG1) includes $$\left\lfloor \frac{C_1}{M_1} \right\rfloor = 1$$

first code block, $C_2\% M_2 = 1$ second CBG (CBG2) includes $$\left\lceil \frac{C_2}{M_2} \right\rceil = 3$$

second code blocks, and $M_2 - C_2\% M_2 = 3$ second CBGs (CBG3, CBG4, and CBG5) each include $$\left\lfloor \frac{C_2}{M_2} \right\rfloor = 2$$

second code blocks.

In the foregoing implementation of the first CBG and the second CBG, different parts of the to-be-transmitted data may be more flexibly assembled into different CBGs, to mitigate impact of retransmission caused by a transmission failure of a part of the to-be-transmitted data on retransmission timeout of another part of the data.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware.

Figure 10:
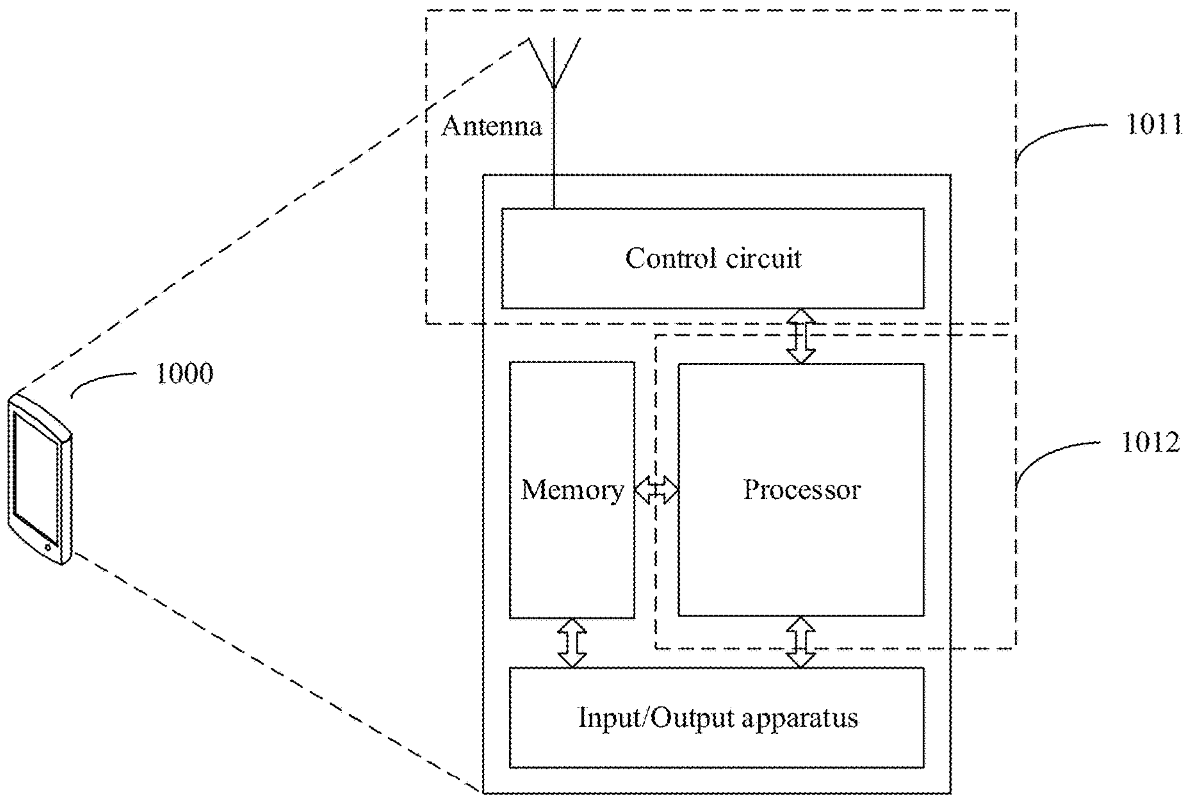
FIG. 10 is a schematic diagram of a structure of a terminal according to an embodiment of this application.

FIG. 10 is a schematic diagram of a structure of a terminal. The terminal is applicable to the scenario shown in FIG. 1, FIG. 2, FIG. 3, FIG. 4, or FIG. 5. The terminal or a component in the terminal may perform the foregoing method 600 and various possible implementations. For ease of description, FIG. 10 shows only main components of the terminal device. As shown in FIG. 10, the terminal device 1000 includes a processor, a memory, a control circuit, an antenna, and an input/output apparatus. The processor is mainly configured to process a communication protocol and communication data, control the entire terminal, execute a software program, and process data of the software program. The memory is configured to store the software program and the data. A radio frequency circuit is mainly configured to perform conversion between a baseband signal and a radio frequency signal, and process the radio frequency signal. The antenna is mainly configured to receive and send the radio frequency signal in a form of an electromagnetic wave. The input/output apparatus, such as a touchscreen, a display, or a keyboard, is mainly configured to receive data input by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in a form of an electromagnetic wave through the antenna. When data is sent to the terminal device, the radio frequency circuit receives a radio frequency signal via the antenna, further converts the radio frequency signal into a baseband signal, and outputs the baseband signal to the processor. The processor converts the baseband signal into data, and processes the data.

For ease of description, only one memory and one processor are shown in FIG. 10. In an actual terminal device, there may be a plurality of processors and memories. The memory may alternatively be referred to as a storage medium, a storage device, or the like. This is not limited in embodiments of the present application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 10 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance a processing capability of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

In an example, the antenna and the control circuit that have a receiving/sending function may be considered as a transceiver unit 1011 of the terminal device 1000, and the processor having a processing function may be considered as a processing unit 1012 of the terminal device 1000. As shown in FIG. 10, the terminal device 1000 includes the transceiver unit 1011 and the processing unit 1012. The transceiver unit may alternatively be referred to as a transceiver, a transceiver machine, a transceiver apparatus, or the like. Optionally, a component that is in the transceiver unit 1011 and that is configured to implement a receiving function may be considered as a receiving unit, and a component that is in the transceiver unit 1011 and that is configured to implement a sending function may be considered as a sending unit. In other words, the transceiver unit 1011 includes the receiving unit and the sending unit. For example, the receiving unit may alternatively be referred to as a receiving machine, a receiver, a receiving circuit, or the like. The sending unit may alternatively be referred to as a transmitter machine, a transmitter, a transmitter circuit, or the like. Optionally, the receiving unit and the sending unit may be one integrated unit, or may be a plurality of independent units. The receiving unit and the sending unit may be located at one geographical position, or may be distributed at a plurality of geographical positions.

Figure 11:
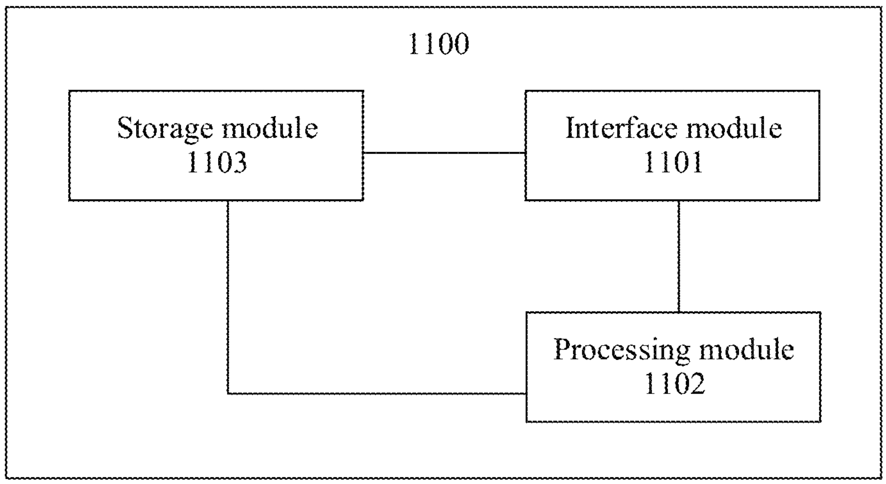
FIG. 11 is a schematic diagram of a structure of an apparatus according to an embodiment of this application.

As shown in FIG. 11, another embodiment of this application provides an apparatus 1100. The apparatus may be a terminal, or may be a component (for example, an integrated circuit or a chip) of a terminal. Alternatively, the apparatus may be a radio access network device, or may be a component (for example, an integrated circuit or a chip) of a network device, or may be a logical module or software that can implement all or some functions of a radio access network device. Alternatively, the apparatus may be another communication module configured to implement the methods in the method embodiments of this application. The apparatus 1100 may include a processing module 1102 (or referred to as a processing unit). Optionally, the apparatus 1100 may further include an interface module 1101 (or referred to as an interface unit) and a storage module 1103 (or referred to as a storage unit).

In a possible design, one or more modules in FIG. 11 may be implemented by using one or more processors, may be implemented by using one or more processors and memories, may be implemented by using one or more processors and transceivers, or may be implemented by using one or more processors, memories, and transceivers. This is not limited in this embodiment of this application. The processor, the memory, and the transceiver may be disposed separately, or may be integrated.

The apparatus has a function of implementing the terminal described in embodiments of this application. For example, the apparatus includes a corresponding module, unit, or means used for the terminal to perform the steps that are related to the terminal and that are described in embodiments of this application. The function, the unit, or the means may be implemented by software or hardware, may be implemented by hardware by executing corresponding software, or may be implemented by a combination of software and hardware. For details, further refer to the corresponding descriptions in the foregoing corresponding method embodiments. Alternatively, the apparatus has a function of implementing the radio access network device described in embodiments of this application. For example, the apparatus includes a corresponding module, unit, or means used for the radio access network device to perform the steps related to the radio access network device that are described in embodiments of this application. The function, the unit, or the means may be implemented by software or hardware, or may be implemented by hardware executing corresponding software, or may be implemented by a combination of software and hardware. For details, further refer to the corresponding descriptions in the foregoing corresponding method embodiments.

Optionally, the modules in the apparatus 1100 in this embodiment of this application may be configured to perform the method 600 described in FIG. 6 in embodiments of this application.

In a possible design, the apparatus 1100 includes a processing module 1102 and an interface module 1101. In some embodiments, the processing module 1102 comprises one or more processors or one or more processing circuits. The interface module 1102 comprises Input/Output ports and/or data buses/signal lines and/or a transceiver.

The processing module 1102 is configured to: obtain an input bit sequence, where the input bit sequence includes a first input bit sequence whose length is $A_1$ and a third input bit sequence whose length is $A_2+L_{CRC1}$, and the third input bit sequence includes a second input bit sequence whose length is $A_2$ and a first CRC bit sequence that corresponds to the first input bit sequence and the second input bit sequence and whose length is $L_{CRC1}$, where $A_1$, $A_2$, and $L_{CRC1}$ are integers greater than 0; obtain $C_1$ first code blocks based on a maximum code block size K and the first input bit sequence, where each first code block includes one first bit segment in the first input bit sequence and a second CRC bit sequence that corresponds to the first bit segment and whose length is $L_{CRC2}$, and a size of each first code block is $K_1$, where K, $K_1$, $C_1$, and $L_{CRC2}$ are integers greater than 0, and $K_1 \leq K$; obtain $C_2$ second code blocks based on the maximum code block size K and the third input bit sequence, where each second code block includes one second bit segment in the third input bit sequence and a third CRC bit sequence that corresponds to the second bit segment and whose length is $L_{CRC3}$, and a size of each second code block is $K_2$, where $K_2$, $C_2$, and $L_{CRC3}$ are integers greater than 0, and $K_2 \leq K$; and perform encoding based on some or all of the $C_1$ first code blocks and the $C_2$ second code blocks, to obtain an encoded bit sequence.

The interface module 1101 is configured to output the encoded bit sequence.

In some possible implementations of the apparatus 1100, the first input bit sequence and the second input bit sequence have different priorities, or it may be understood that the first input bit sequence and the second input bit sequence are of different importance.

For example, the first input bit sequence corresponds to a base-layer data stream, and the second input bit sequence corresponds to an enhancement-layer data stream; or the first input bit sequence corresponds to an enhancement-layer data stream, and the second input bit sequence corresponds to a base-layer data stream.

For another example, the first input bit sequence corresponds to a data stream within the FOV, and the second input bit sequence corresponds to a data stream outside the FOV; or the first input bit sequence corresponds to a data stream outside an FOV, and the second input bit sequence corresponds to a data stream within the FOV.

In some possible implementations of the apparatus 1100, the processing module 1102 may be configured to obtain an input bit sequence by using the following method: obtaining the first input bit sequence and the second input bit sequence, and generating the first CRC sequence based on the first input bit sequence and the second input bit sequence. For example, the first CRC bit sequence whose length is $L_{CRC1}$ is generated based on the first input bit sequence whose length is $A_1$ and the second input bit sequence whose length is $A_2$, where $L_{CRC1}$ is 6, 11, 16, or 24.

In some possible implementations of the apparatus 1100, $C_1$ and $C_2$ respectively satisfy:

$$C_1 = \left\lceil \frac{A_1}{K - L_{CRC2}} \right\rceil$$
$$C_2 = \left\lceil \frac{A_2 + L_{CRC1}}{K - L_{CRC3}} \right\rceil$$

where ⌈ ⌉ means rounding up. Optionally, a total length $$K_1'$$

of a first bit segment and a second CRC bit sequence that are included in each first code block and a total length $$K_2'$$

of a second bit segment and a third CRC bit sequence that are included in each second code block respectively satisfy:

$$K_1' = \left\lceil \frac{A_1 + C_1 \cdot L_{CRC2}}{C_1} \right\rceil \leq K_1$$
$$K_2' = \left\lceil \frac{A_2 + L_{CRC1} + C_2 \cdot L_{CRC3}}{C_2} \right\rceil \leq K_2$$

In some possible implementations of the apparatus 1100, $A_1\%\ C_1$ first code blocks in the $C_1$ first code blocks further include a first padding bit sequence whose length is $F_{11}$, and $C_1-A_1\%\ C_1$ first code blocks in the $C_1$ first code blocks further include a second padding bit sequence whose length is $F_{12}$, where $F_{11}$ and $F_{12}$ respectively satisfy:

$$F_{11} = K_1 - \left\lceil \frac{A_1 + C_1 \cdot L_{CRC2}}{C_1} \right\rceil$$
$$F_{12} = K_1 - \left\lfloor \frac{A_1 + C_1 \cdot L_{CRC2}}{C_1} \right\rfloor$$

where ⌊ ⌋ means rounding down, and % represents a modulo operation.

It may be understood that when $A_1\%\ C_1=0$, a length of a padding bit sequence included in each of the $C_1$ first code blocks is $$K_1 - \frac{A_1 + C_1 \cdot L_{CRC2}}{C_1}.$$

That is, when $A_1\%\ C_1=0$, each of the $C_1$ first code blocks includes a padding bit sequence of the same length.

In some possible implementations of the apparatus 1100, $(A_2+L_{CRC1})\%\ C_2$ second code blocks in the $C_2$ second code blocks further include a third padding bit sequence whose length is $F_{21}$, and $C_2-(A_2+L_{CRC1})\%\ C_2$ second code blocks in the $C_2$ second code blocks further include a fourth padding bit sequence whose length is $F_{22}$, where $F_{21}$ and $F_{22}$ respectively satisfy:

$$F_{21}=K_2-\left\lceil\frac{A_2+L_{CRC1}+C_2\cdot L_{CRC3}}{C_2}\right\rceil$$

$$F_{22}=K_2-\left\lfloor\frac{A_2+L_{CRC1}+C_2\cdot L_{CRC3}}{C_2}\right\rfloor$$

It may be understood that when $(A_2+L_{CRC1})\%\ C_2=0$, a length of a padding bit sequence included in each of the $C_2$ second code blocks is $$K_2-\frac{A_2+L_{CRC1}+C_2\cdot L_{CRC3}}{C_2}.$$

That is, when $(A_2+L_{CRC1})\%\ C_2=0$, each of the $C_2$ second code blocks includes a padding bit sequence of the same length.

In some possible implementations of the apparatus 1100, when the apparatus 1100 is a terminal or a component of a terminal, the interface module 1101 is further configured to receive first indication information, where the first indication information indicates at least one of $A_1$ or $A_2$. When the apparatus 1100 is a radio access network device, a component (for example, a processor, a chip, or a chip system) of a radio access network device, or a logical module or software that can implement all or some functions of a radio access network device, the interface module 1101 is further configured to send first indication information, where the first indication information indicates at least one of $A_1$ or $A_2$.

Optionally, the first indication information may be included in DCI or an RRC message. The first indication information may indicate a value of $A_1$ or $A_2$, or indicate a proportion $\alpha$ of $A_1$ or $A_2$ in the payload size corresponding to the TB, or may include an index corresponding to $A_1$ or $A_2$, where the index indicates a proportion $\beta$ of $A_1$ or $A_2$ in the payload size corresponding to the TB.

In some possible implementations of the apparatus 1100, the $C_1$ first code blocks are grouped into $M_1$ first CBGs, and the $C_2$ second code blocks are grouped into $M_2$ second CBGs, where $M_1$ and $M_2$ are integers greater than 0.

In a possible implementation of the first CBG and the second CBG, $M_1$ and $M_2$ respectively satisfy:

$$M_1=\min(N_1, C_1)$$

$$M_2=\min(N_1, C_2)$$

where $N_1>0$ represents a first maximum quantity of CBGs. $N_1$ may be predefined, or may be configured by using an RRC message. This implementation may be understood as that a same maximum quantity of CBGs is configured for the first CBG and the second CBG.

Optionally, $C_1\%\ M_1$ first CBGs in the $M_1$ first CBGs each include $$\left\lceil\frac{C_1}{M_1}\right\rceil$$

first code blocks, $M_1-C_1\%\ M_1$ first CBGs in the $M_1$ first CBGs each include $$\left\lfloor\frac{C_1}{M_1}\right\rfloor$$

first code blocks, $C_2\%\ M_2$ second CBGs in the $M_2$ second CBGs each include $$\left\lceil\frac{C_2}{M_2}\right\rceil$$

second code blocks, and $M_2-C_2\%\ M_2$ second CBGs in the $M_2$ second CBGs each include $$\left\lfloor\frac{C_2}{M_2}\right\rfloor$$

second code blocks.

In another possible implementation of the first CBG and the second CBG, $M_1$ and $M_2$ respectively satisfy:

$$M_1=\min(N_2, C_1)$$

$$M_2=\min(N_3, C_2)$$

where $N_2>0$ and $N_3>0$ respectively represent the second maximum quantity of CBGs and the third maximum quantity of CBGs. $N_2$ and the $N_3$ may be predefined, or may be configured by using an RRC message. This implementation may be understood as that a maximum quantity of CBGs is configured for both the first CBG and the second CBG, and $N_2$ and $N_3$ may be the same or may be different.

Optionally, $C_1\%\ M_1$ first CBGs in the $M_1$ first CBGs each include $$\left\lceil\frac{C_1}{M_1}\right\rceil$$

first code blocks, $M_1-C_1\%\ M_1$ first CBGs in the $M_1$ first CBGs each include $$\left\lfloor\frac{C_1}{M_1}\right\rfloor$$

first code blocks, $C_2\%\ M_2$ second CBGs in the $M_2$ second CBGs each include $$\left\lceil\frac{C_2}{M_2}\right\rceil$$

second code blocks, and $M_2-C_2\%\ M_2$ second CBGs in the $M_2$ second CBGs each include $$\left\lfloor \frac{C_2}{M_2} \right\rfloor$$

second code blocks.

It may be understood that, for beneficial effects corresponding to the apparatus 1100 and various possible implementations, reference may be made to the descriptions in the foregoing method embodiments. Details are not described herein again.

Optionally, the apparatus 1100 may further include a storage module 1103. The storage module 1103 is configured to store data or instructions (which may also be referred to as code or programs). Other modules in the apparatus 1100 may interact with or be coupled to the storage module, to implement a corresponding method or function. For example, the processing module 1102 may read data or instructions in the storage module 1103, so that the apparatus 1100 implements the methods in the foregoing embodiments.

In an example, the module in the foregoing apparatus may be one or more integrated circuits configured to implement the foregoing method, for example, one or more application-specific integrated circuits (ASIC), or one or more microprocessors (DSP), or one or more field programmable gate arrays (FPGA), or a combination of at least two of these integrated circuit forms. For another example, when the module in the apparatus may be implemented by scheduling a program by a processing element, the processing element may be a general-purpose processor, for example, a central processing unit (CPU) or another processor that can invoke the program. For another example, the units may be integrated together and implemented in a form of a system-on-a-chip (SOC).

Figure 12:
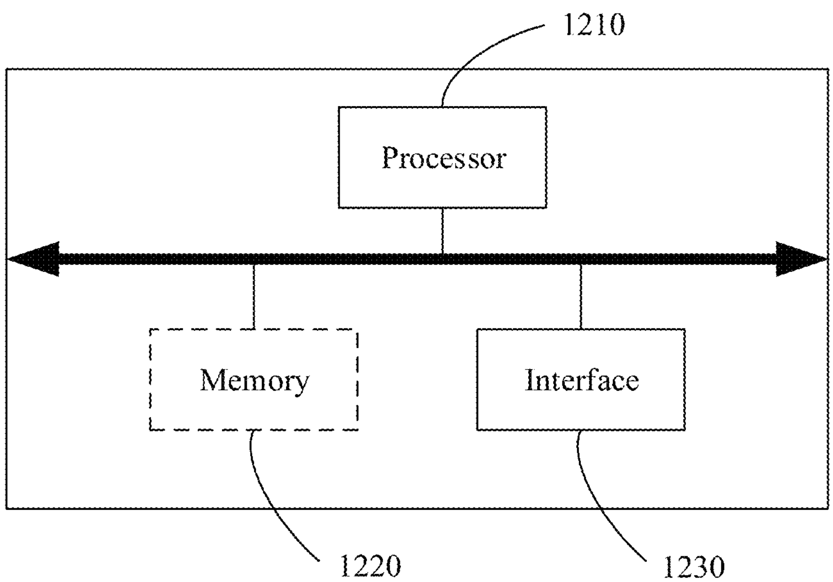
FIG. 12 is a schematic diagram of another apparatus according to an embodiment of this application.

FIG. 12 is a schematic diagram of an apparatus according to an embodiment of this application. The apparatus is configured to implement the foregoing method 600 and various possible implementations. As shown in FIG. 12, the apparatus includes a processor 1210 and an interface 1230. The processor 1210 is coupled to the interface 1230. The interface 1230 is configured to implement communication with another module or device. The interface 1230 may be a transceiver or an input/output interface. The interface 1230 may be, for example, an interface circuit. Optionally, the apparatus may further include a memory 1220, configured to store instructions executed by the processor 1210, or store input data required by the processor 1210 to run instructions, or store data generated after the processor 1210 runs instructions.

The method 600 and various possible implementations may be implemented by the processor 1210 by invoking a program or an instruction stored in the memory 1220. The memory 1220 may be inside the apparatus, or may be outside the apparatus. This is not limited in this application.

Optionally, functions/implementation processes of the interface module 1101 and the processing module 1102 in FIG. 11 may be implemented by using the processor 1210 in the apparatus shown in FIG. 12. Alternatively, the functions/implementation processes of the processing module 1102 in FIG. 11 may be implemented by using the processor 1210 in the apparatus shown in FIG. 12, and the function/implementation process of the interface module 1101 in FIG. 11 may be implemented by using the interface 1230 in the apparatus shown in FIG. 12. For example, the function/implementation process of the interface module 1101 may be implemented by the processor by invoking a program instruction in the memory to drive the interface 1230.

When the foregoing apparatus is a chip used in a terminal, the chip in the terminal implements a function of the terminal in the foregoing method embodiments. The chip receives information from another module (for example, a radio frequency module or an antenna) in the terminal, where the information is from another terminal or a radio access network device; or the chip sends information to another module (for example, a radio frequency module or an antenna) in the terminal, where the information is sent by the terminal to the other terminal or the radio access network device.

When the foregoing apparatus is a chip applied to a radio access network device, the chip implements a function of the radio access network device in the foregoing method embodiments. The chip receives information from another module (for example, a radio frequency module or an antenna) in the radio access network device, where the information is from another radio access network device or a terminal; or the chip sends information to another module (for example, a radio frequency module or an antenna) in the radio access network device, where the information is sent by the radio access network device to the another radio access network device or the terminal.

A person of ordinary skill in the art may understand that various numbers such as "first" and "second" in this application are merely used for differentiation for ease of description, and are not used to limit the scope of embodiments of this application or represent a sequence. The term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. "At least one" means one or more. "At least two" means two or more. "At least one", "any one", or a similar expression thereof indicates any combination of the items, and includes a singular item (piece) or any combination of plural items (pieces). For example, at least one of a, b, or c may indicate: a, b, c, a and b, a and c, b and c, or a, b, and c, where a, b, and c may be singular or plural. "A plurality of" means two or more, and another quantifier is similar to this.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of the present application.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, the procedure or functions according to embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Steps of the methods described in embodiments of this application may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information to the storage medium. Optionally, the storage medium may alternatively be integrated into a processor. The processor and the storage medium may be disposed in the ASIC.

This application further provides a computer-readable medium, where the computer-readable medium stores a computer program, and the computer program implements a function of any one of the foregoing method embodiments when being executed by a computer.

This application further provides a computer program product, and the computer program product implements a function of any one of the foregoing method embodiments when being executed by a computer.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The foregoing descriptions are implementations of this application, but are not intended to limit the protection scope of this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application.

What is claimed is:

1. An apparatus, comprising:

one or more processors to execute instructions causing the apparatus to:

obtain an input bit sequence, wherein the input bit sequence comprises a first input bit sequence with a length of $A_1$ and a third input bit sequence with a length of $A_2+L_{CRC1}$, and the third input bit sequence comprises a second input bit sequence with a length of $A_2$ and a first cyclic redundancy check (CRC) bit sequence that corresponds to the first input bit sequence and the second input bit sequence and is of a length of $L_{CRC1}$, wherein $A_1$, $A_2$, and $L_{CRC1}$ are integers greater than 0;

perform code block segmentation and code block CRC addition on the first input bit sequence based on a maximum code block size K to obtain $C_1$ first code blocks, wherein each first code block comprises one first bit segment in the first input bit sequence and a second CRC bit sequence that corresponds to the first bit segment and is of a length of $L_{CRC2}$, and a size of each first code block is $K_1$, wherein K, $K_1$, $C_1$, and $L_{CRC2}$ are integers greater than 0, and $K_1 \leq K$;

perform code block segmentation and code block CRC addition on the third input bit sequence based on the maximum code block size K to obtain $C_2$ second code blocks, wherein each second code block comprises one second bit segment in the third input bit sequence and a third CRC bit sequence that corresponds to the second bit segment and is of a length of $L_{CRC3}$, and a size of each second code block is $K_2$, wherein $K_2$, $C_2$, and $L_{CRC3}$ are integers greater than 0, and $K_2 \leq K$;

perform encoding based on some or all of the $C_1$ first code blocks and the $C_2$ second code blocks, to obtain an encoded bit sequence; and output the encoded bit sequence.

2. The apparatus according to claim 1, wherein the apparatus is further caused to receive first indication information, wherein the first indication information indicates at least one of $A_1$ or $A_2$ as a length parameter for use in obtaining the $C_1$ first code blocks or the $C_2$ second code blocks.

3. The apparatus according to claim 1, wherein the $C_1$ first code blocks are grouped into $M_1$ first code block groups, the $C_2$ second code blocks are grouped into $M_2$ second code block groups, and $M_1$ and $M_2$ are integers greater than 0.

4. The apparatus according to claim 3, wherein $M_1$ and $M_2$ respectively satisfy:

$$M_1 = \min(N_1, C_1)$$

$$M_2 = \min(N_1, C_2)$$

wherein $N_1>0$ represents a first maximum quantity of code block groups, and min (x,y) represents a smaller value in x and y.

5. The apparatus according to claim 4, wherein the apparatus is further caused to receive first configuration information, wherein the first configuration information is used to configure the first maximum quantity $N_1$ of code block groups.

6. The apparatus according to claim 4, wherein $C_1 \% M_1$ first code block groups in the $M_1$ first code block groups each comprise $$\left\lceil \frac{C_1}{M_1} \right\rceil$$

first code blocks, and $M_1 - C_1 \% M_1$ first code block groups in the $M_1$ first code block groups each comprise $$\left\lfloor \frac{C_1}{M_1} \right\rfloor$$

first code blocks; and $C_2\%\ M_2$ second code block groups in the $M_2$ second code block groups each comprise $$\left\lceil \frac{C_2}{M_2} \right\rceil$$

second code blocks, and $M_2 - C_2\%\ M_2$ second code block groups in the $M_2$ second code block groups each comprise $$\left\lfloor \frac{C_2}{M_2} \right\rfloor$$

second code blocks, wherein $\lceil\ \rceil$ means rounding up, $\lfloor\ \rfloor$ means rounding down, and % represents a modulo operation.

7. The apparatus according to claim 1, wherein the first input bit sequence and the second input bit sequence have different priorities.

8. A non-transitory computer readable medium storing instructions that are executable by a computer, the non-transitory computer readable medium is applied to a first communication apparatus, and the instructions comprise instructions that cause the first communication apparatus to perform:

obtaining an input bit sequence, wherein the input bit sequence comprises a first input bit sequence with a length of $A_1$ and a third input bit sequence with a length of $A_2+L_{CRC1}$, and the third input bit sequence comprises a second input bit sequence of a length of $A_2$ and a first cyclic redundancy check (CRC) bit sequence that corresponds to the first input bit sequence and the second input bit sequence and is of a length of $L_{CRC1}$, wherein $A_1$, $A_2$, and $L_{CRC1}$ are integers greater than 0;

performing code block segmentation and code block CRC addition on the first input bit sequence based on a maximum code block size K to obtain $C_1$ first code blocks, wherein each first code block comprises one first bit segment in the first input bit sequence and a second CRC bit sequence that corresponds to the first bit segment and is of a length of $L_{CRC2}$, and a size of each first code block is $K_1$, wherein K, $K_1$, $C_1$, and $L_{CRC2}$ are integers greater than 0, and $K_1 \le K$;

performing code block segmentation and code block CRC addition on the third input bit sequence based on the maximum code block size K to obtain $C_2$ second code blocks, wherein each second code block comprises one second bit segment in the third input bit sequence and a third CRC bit sequence that corresponds to the second bit segment and whose length is $L_{CRC3}$, and a size of each second code block is $K_2$, wherein $K_2$, $C_2$, and $L_{CRC3}$ are integers greater than 0, and $K_2 \le K$;

performing encoding based on some or all of the $C_1$ first code blocks and the $C_2$ second code blocks, to obtain an encoded bit sequence; and outputting the encoded bit sequence.

9. The non-transitory computer readable medium according to claim 8, wherein the instructions further comprise instructions for:

receiving first indication information, wherein the first indication information indicates at least one of $A_1$ or $A_2$ as a length parameter for use in obtaining the $C_1$ first code blocks or the $C_2$ second code blocks.

10. The non-transitory computer readable medium according to claim 8, wherein the $C_1$ first code blocks are grouped into $M_1$ first code block groups, the $C_2$ second code blocks are grouped into $M_2$ second code block groups, and $M_1$ and $M_2$ are integers greater than 0.

11. The non-transitory computer readable medium according to claim 10, wherein $M_1$ and $M_2$ respectively satisfy:

$$M_1 = \min(N_1, C_1)$$

$$M_2 = \min(N_1, C_2)$$

wherein $N_1>0$ represents a first maximum quantity of code block groups, and min (x,y) represents a smaller value in x and y.

12. The non-transitory computer readable medium according to claim 11, wherein the instructions further comprise instructions for:

receiving first configuration information, wherein the first configuration information is used to configure the first maximum quantity $N_1$ of code block groups.

13. The non-transitory computer readable medium according to claim 11, wherein $C_1\%\ M_1$ first code block groups in the $M_1$ first code block groups each comprise $$\left\lceil \frac{C_1}{M_1} \right\rceil$$

first code blocks, and $M_1 - C_1\%\ M_1$ first code block groups in the $M_1$ first code block groups each comprise $$\left\lfloor \frac{C_1}{M_1} \right\rfloor$$

first code blocks; and $C_2\%\ M_2$ second code block groups in the $M_2$ second code block groups each comprise $$\left\lceil \frac{C_2}{M_2} \right\rceil$$

second code blocks, and $M_2 - C_2\%\ M_2$ second code block groups in the $M_2$ second code block groups each comprise $$\left\lfloor \frac{C_2}{M_2} \right\rfloor$$

second code blocks, wherein $\lceil\ \rceil$ means rounding up, $\lfloor\ \rfloor$ means rounding down, and % represents a modulo operation.

* * * * *